United States Patent
Pitis

(10) Patent No.: US 9,641,991 B2
(45) Date of Patent: May 2, 2017

(54) SYSTEMS AND METHODS FOR DETERMINING A USER CONTEXT BY CORRELATING ACCELERATION DATA FROM MULTIPLE DEVICES

(71) Applicant: VectorWatch SRL, Bucuresti (RO)

(72) Inventor: Andrei Pitis, Bucuresti (RO)

(73) Assignee: Fitbit, Inc., San Francisco, CA (US)

( * ) Notice: Subject to any disclaimer, the term of this patent is extended or adjusted under 35 U.S.C. 154(b) by 6 days.

(21) Appl. No.: 14/590,901

(22) Filed: Jan. 6, 2015

(65) Prior Publication Data
US 2016/0198322 A1    Jul. 7, 2016

(51) Int. Cl.
*H04W 4/18*    (2009.01)
*H04W 4/00*    (2009.01)

(52) U.S. Cl.
CPC ............ *H04W 4/18* (2013.01); *H04W 4/008* (2013.01)

(58) Field of Classification Search
CPC ......... H04W 4/008; H04W 4/18; H04W 4/02; H04W 4/027; H04W 12/06; H04W 12/08; H04W 4/046; H04W 4/12; H04W 52/0254; H04W 52/0264; H04W 52/027; H04W 52/0274; H04W 64/006; H04W 88/02; G05B 19/40; G05B 19/406; G05B 2219/37432
USPC ........................................................ 455/420
See application file for complete search history.

(56) References Cited

U.S. PATENT DOCUMENTS

| | | | |
|---|---|---|---|
| 8,463,573 B2 | 6/2013 | Flentov et al. | |
| 8,600,928 B2 | 12/2013 | Landers | |
| 8,784,271 B2 | 7/2014 | Brumback et al. | |
| 2010/0298650 A1 | 11/2010 | Moon et al. | |
| 2013/0179116 A1 | 7/2013 | Rahman et al. | |
| 2013/0184843 A1 | 7/2013 | Ellis et al. | |
| 2013/0207889 A1 | 8/2013 | Chang et al. | |
| 2013/0217979 A1 | 8/2013 | Blackadar et al. | |
| 2013/0274904 A1 | 10/2013 | Coza et al. | |
| 2013/0282324 A1 | 10/2013 | Carter et al. | |
| 2013/0316744 A1 | 11/2013 | Newham et al. | |
| 2013/0332286 A1 | 12/2013 | Medelius et al. | |
| 2014/0028539 A1 | 1/2014 | Newham et al. | |
| 2014/0031703 A1 | 1/2014 | Rayner et al. | |
| 2014/0099614 A1 | 4/2014 | Hu et al. | |
| 2014/0142403 A1 | 5/2014 | Brumback et al. | |
| 2014/0164611 A1 | 6/2014 | Molettiere et al. | |
| 2014/0180456 A1 | 6/2014 | Weast et al. | |
| 2014/0197965 A1 | 7/2014 | Park et al. | |
| 2014/0228988 A1 | 8/2014 | Hoffman et al. | |
| 2014/0270375 A1* | 9/2014 | Canavan ............ | A63B 24/0062 382/103 |
| 2014/0278219 A1* | 9/2014 | Canavan ............ | A63B 24/0062 702/150 |

(Continued)

*Primary Examiner* — Hirdepal Singh
(74) *Attorney, Agent, or Firm* — Law Office of Andrei D Popovici, PC

(57) ABSTRACT

Described systems and methods enable the detection of a user activity context indicative of a user's current activity, by correlating the motion of a wrist-worn device (e.g., watch) with the motion of a mobile telephone. Some embodiments further correlate motion data with a location indicator provided by the mobile telephone, and with a current time of the day. The watch and/or mobile telephone may switch to a context-specific operation mode in response to determining the user activity context.

32 Claims, 15 Drawing Sheets

(56) References Cited

U.S. PATENT DOCUMENTS

| | | | |
|---|---|---|---|
| 2014/0344375 A1* | 11/2014 | Hauser | H04L 51/04 709/206 |
| 2014/0359499 A1* | 12/2014 | Cho | G06F 3/0481 715/765 |
| 2015/0065893 A1* | 3/2015 | Ye | A61B 5/6898 600/483 |
| 2015/0087478 A1* | 3/2015 | Zhang | A63B 24/0003 482/8 |
| 2015/0153928 A1* | 6/2015 | Chen | G06F 3/0488 715/863 |
| 2015/0230022 A1* | 8/2015 | Sakai | H04R 1/1041 381/58 |
| 2015/0293590 A1* | 10/2015 | Lehtiniemi | G06F 3/016 715/702 |
| 2016/0065655 A1* | 3/2016 | Bentley | H04L 67/10 709/201 |

* cited by examiner

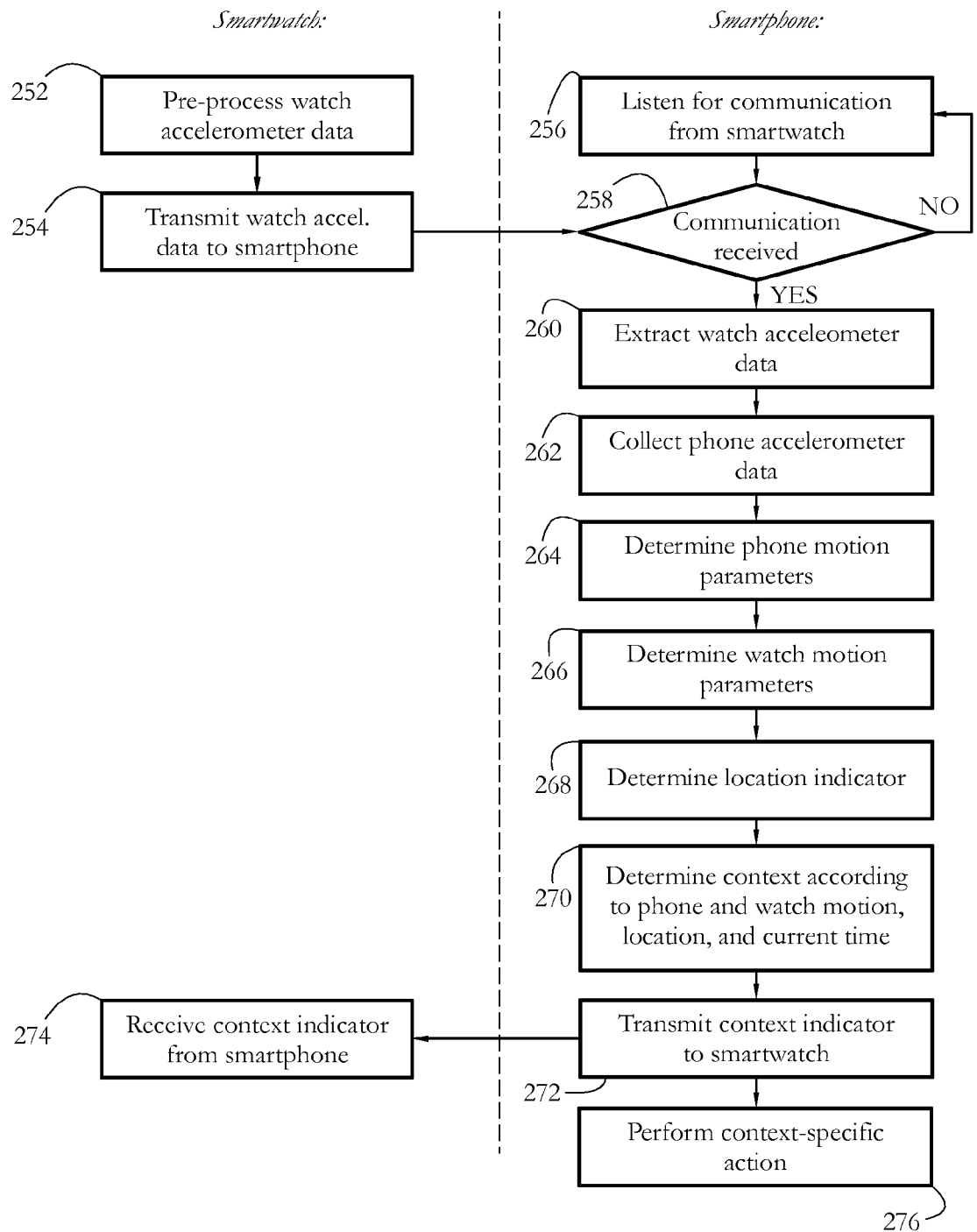
FIG. 13-A

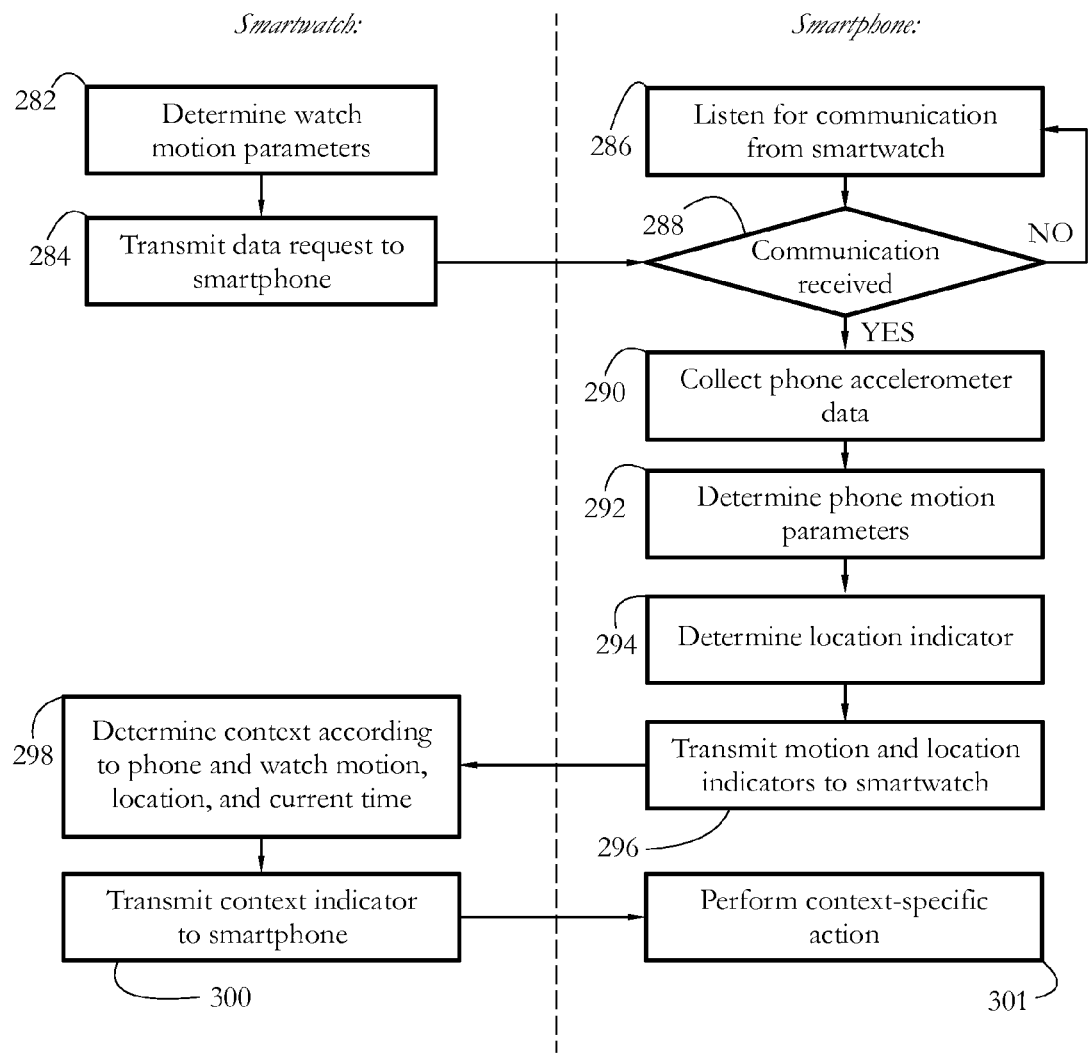
FIG. 13-B

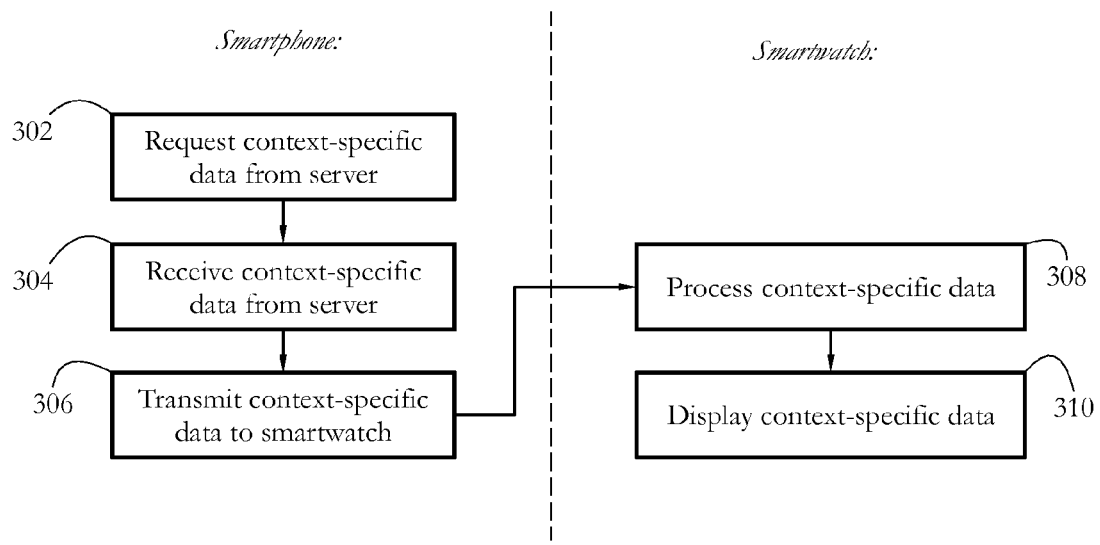
FIG. 15-A
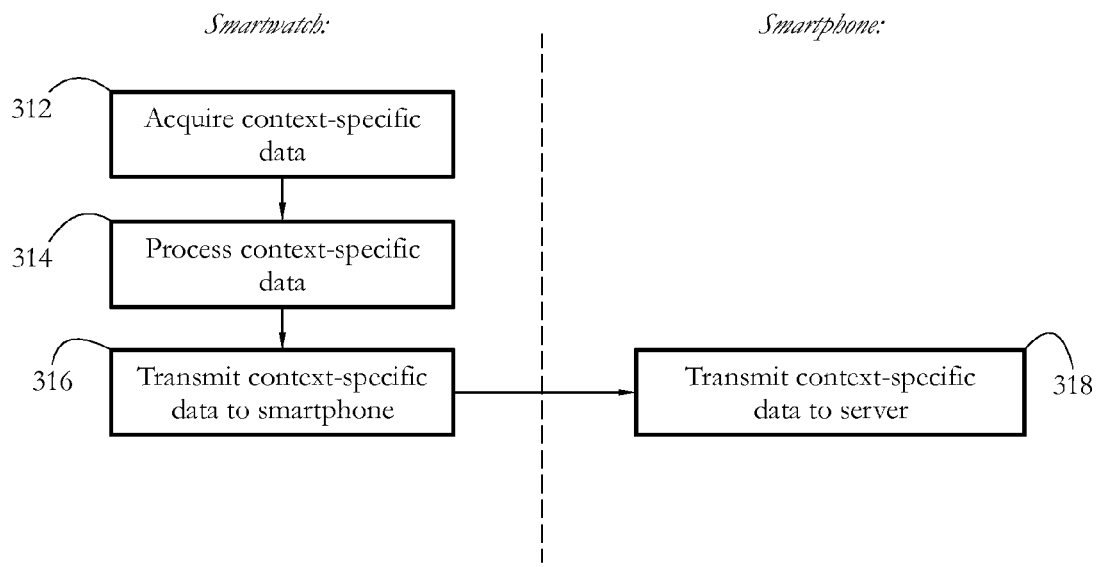
FIG. 15-B

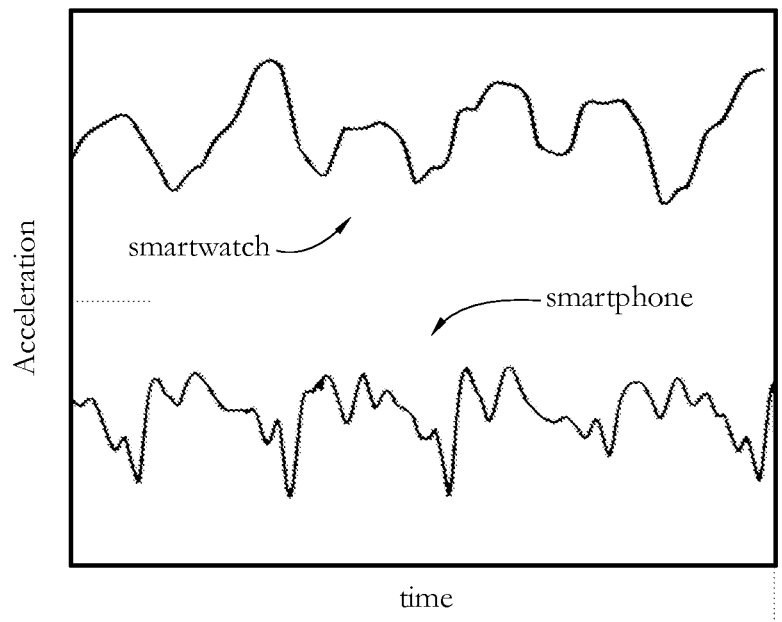
FIG. 16-A
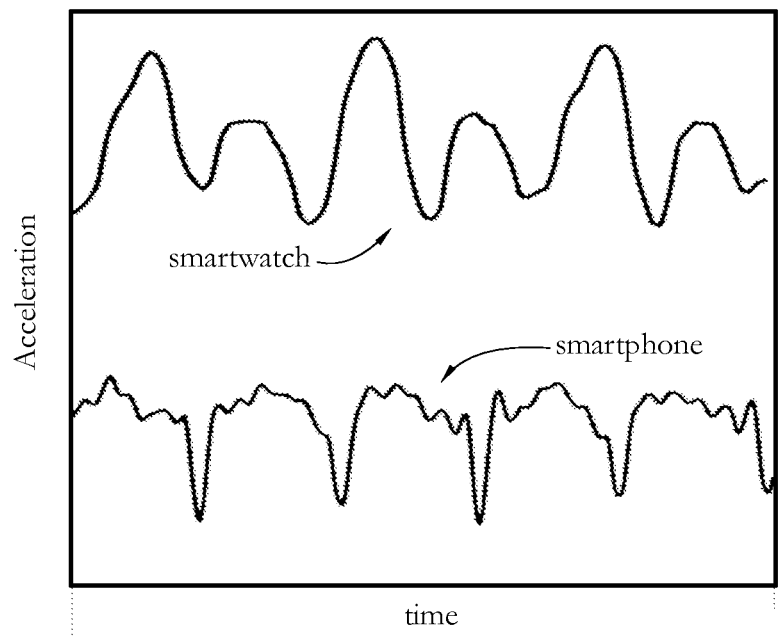
FIG. 16-B

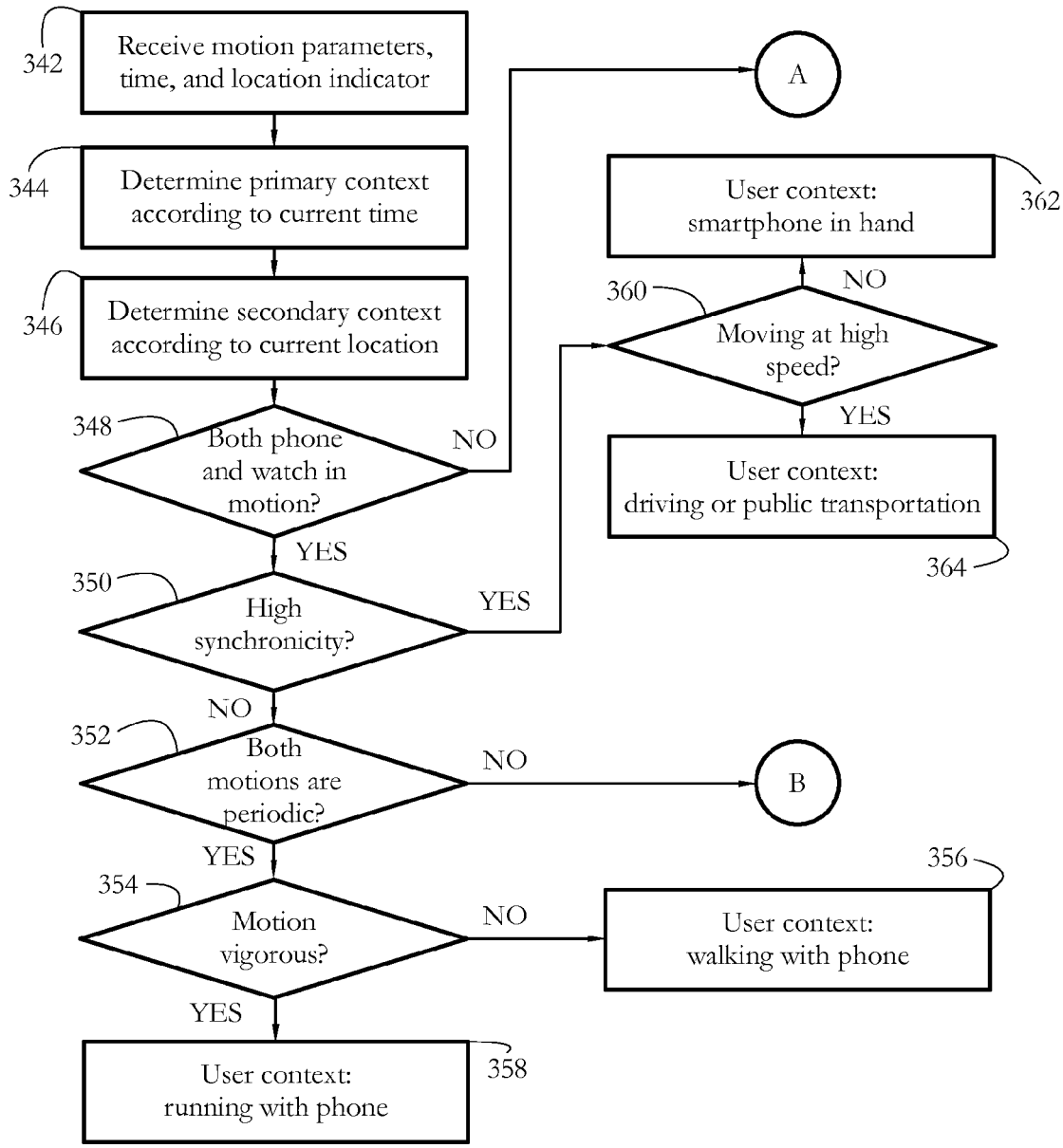
FIG. 18-A

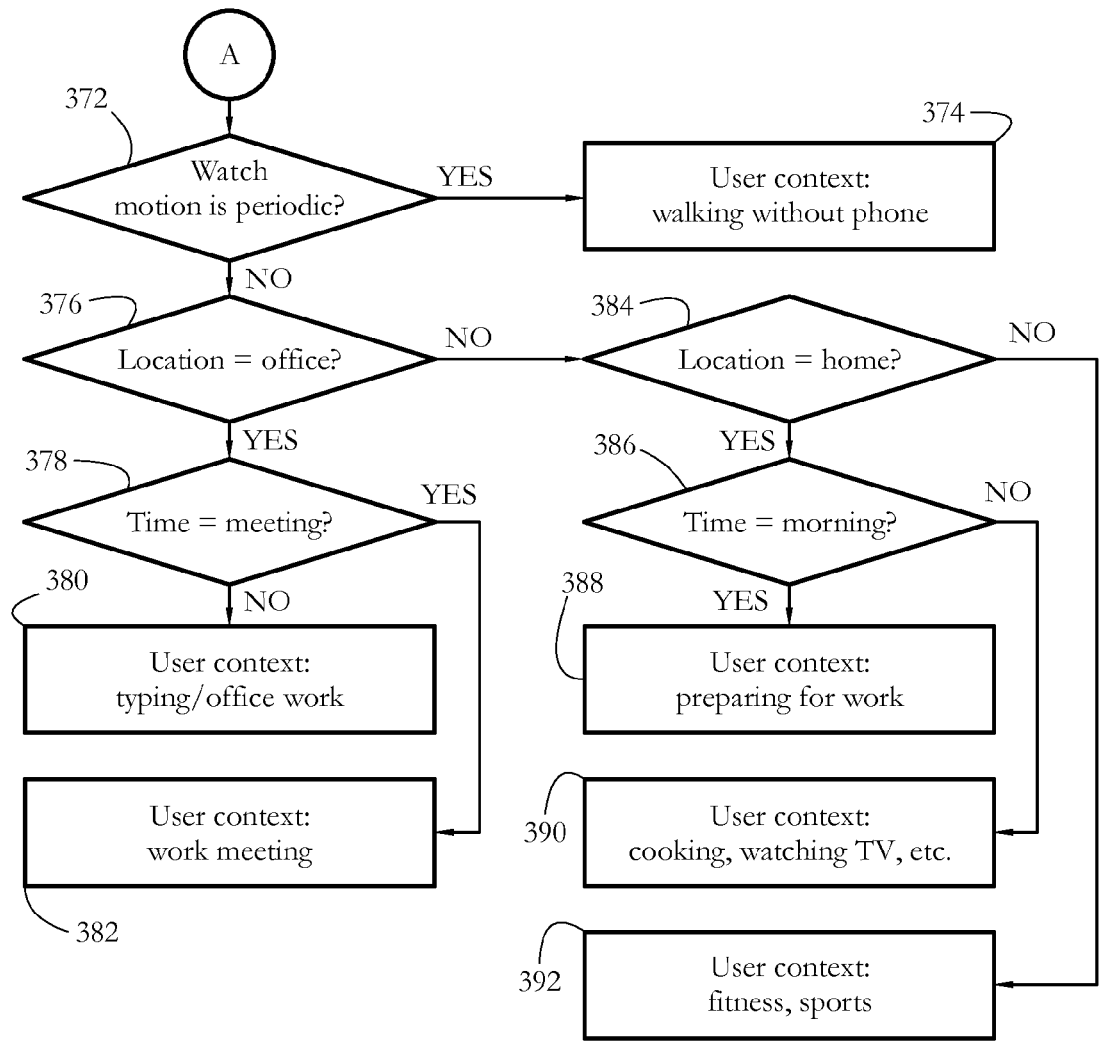
FIG. 18-B

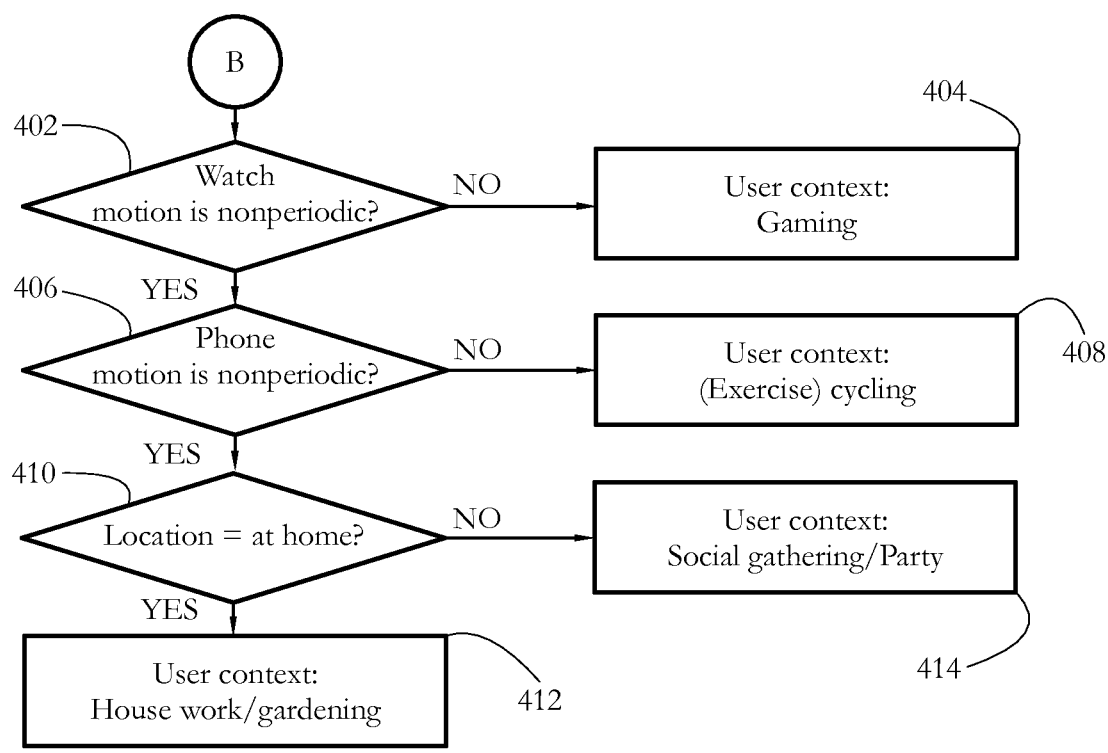
FIG. 18-C

SYSTEMS AND METHODS FOR DETERMINING A USER CONTEXT BY CORRELATING ACCELERATION DATA FROM MULTIPLE DEVICES

BACKGROUND

The invention relates to wearable computing devices, and in particular to watches capable of displaying customizable content.

Some mobile computing and telecommunication devices, such as smartphones and wearable computing devices, are capable of executing a variety of application programs, commonly known as apps. Such apps may acquire data about a user's behavior, health and/or current activity, and may display information to the user. The displayed information may be tailored according to the respective user's needs, interests, and/or preferences.

Applications may use components, features, and functionalities of the respective device, such as a heartbeat sensor, a camera or a geolocation feature of the device. For instance, an application may determine a current geographical location of the user and display a list of restaurants located in the vicinity of the current position. In another example, a fitness band may determine a distance run by the user, a count of calories consumed by the user, and/or a current heart rate of the user. The respective fitness band may also display a progress indicator, indicating, for instance, a degree of completion of some predetermined fitness goal.

The performance and functionality of mobile computing devices is often limited by their size and positioning on the user's body (e.g., pocket, wrist, shoe). Since wearable devices are typically small and light and therefore do not incorporate a substantial power source, battery life is a further significant limitation. There is significant interest in developing wearable devices featuring rich functionality and customizable displays, delivered with a high energy efficiency.

SUMMARY

According to one aspect, a wearable computing device comprises a processor and a first accelerometer connected to the processor. The wearable computing device is configured to attach to a wrist of a user's hand. The first accelerometer is configured to determine a first motion indicator indicative of a motion of the wearable computing device. The processor is configured to execute a context-specific action selected according to a user activity context representing a class of activities performed by the user, wherein the user activity context is determined according to the first motion indicator and according to a second motion indicator indicative of a motion of a mobile telephone communicatively coupled to the wearable computing device, the second motion indicator determined by a second accelerometer of the mobile telephone.

According to another aspect, a method comprises employing an accelerometer of a wearable computing device to determine a first motion indicator indicative of a motion of the wearable computing device, wherein the wearable computing device is configured to attach to a wrist of a user's hand. The method further comprises employing a processor of a mobile telephone communicatively coupled to the wearable computing device to determine a user activity context representing a class of activities performed by the user, wherein the user activity context is determined according to the first motion indicator and according to a second motion indicator indicative of a motion of the mobile telephone, wherein the second motion indicator is determined by an accelerometer of the mobile telephone. The method further comprises employing a processor of the wearable computing device to execute a first context-specific action selected according to the user activity context.

According to another aspect, a non-transitory computer-readable medium stores instructions which, when executed by a processor of a wearable computing device configured to attach to a wrist of a user's hand, causes the wearable computing device to employ an accelerometer of the wearable computing device to determine a first motion indicator indicative of a motion of the wearable computing device. The instructions further cause the wearable computing device to execute a context-specific action selected according to a user activity context representing a class of activities performed by the user, wherein the user activity context is determined according to the first motion indicator and according to a second motion indicator indicative of a motion of a mobile telephone communicatively coupled to the wearable computing device, the second motion indicator determined by a second accelerometer of the mobile telephone.

According to another aspect, a non-transitory computer-readable medium stores instructions which, when executed by a processor of mobile telephone communicatively coupled to a wearable computing device configured to attach to a wrist of a user's hand, causes the mobile telephone to employ an accelerometer of the mobile telephone to determine a first motion indicator indicative of a motion of the mobile telephone. The instructions further cause the mobile telephone to determine a user activity context representing a class of activities performed by the user, wherein the user activity context is determined according to the first motion indicator and according to a second motion indicator indicative of a motion of the wearable computing device, the second motion indicator determined by an accelerometer of the wearable computing device. The instructions further cause the mobile telephone, in response to determining the user activity context, to execute a context-specific action selected according to the user activity context.

BRIEF DESCRIPTION OF THE DRAWINGS

The foregoing aspects and advantages of the present invention will become better understood upon reading the following detailed description and upon reference to the drawings where:

FIG. 13-A shows an exemplary sequence of steps performed by the smartphone and smartwatch in an embodiments of the present invention wherein context detection is performed by the smartphone.

FIG. 13-B shows an exemplary sequence of steps performed by the smartphone and smartwatch in an embodiments of the present invention wherein context detection is performed by the smartwatch.

FIG. 15-A shows an exemplary sequence of steps performed by the smartphone and smartwatch to retrieve context-specific data from the back-end server, according to some embodiments of the present invention.

FIG. 15-B shows an exemplary sequence of steps performed by the smartphone and smartwatch to send context-specific data to the back-end server, according to some embodiments of the present invention.

FIG. 16-A shows exemplary acceleration signals detected on the smartphone and smartwatch according to some embodiments of the present invention.

FIG. 16-B shows other exemplary acceleration signals detected on the smartphone and smartwatch according to some embodiments of the present invention.

FIG. 18-A shows an exemplary sequence of steps performed by the smartwatch and/or the smartphone to determine a user context according to some embodiments of the present invention FIG. 18-B shows other exemplary steps performed by the smartwatch and/or the smartphone to determine the user context according to some embodiments of the present invention.

FIG. 18-C shows yet other exemplary steps performed by the smartwatch and/or the smartphone to determine the user context according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g. one or more processors) programmed to perform the methods described herein, as well as computer-readable media encoding processor instructions usable to configure a processor to perform the methods described herein.

The following description illustrates embodiments of the invention by way of example and not necessarily by way of limitation.

Figure 1:
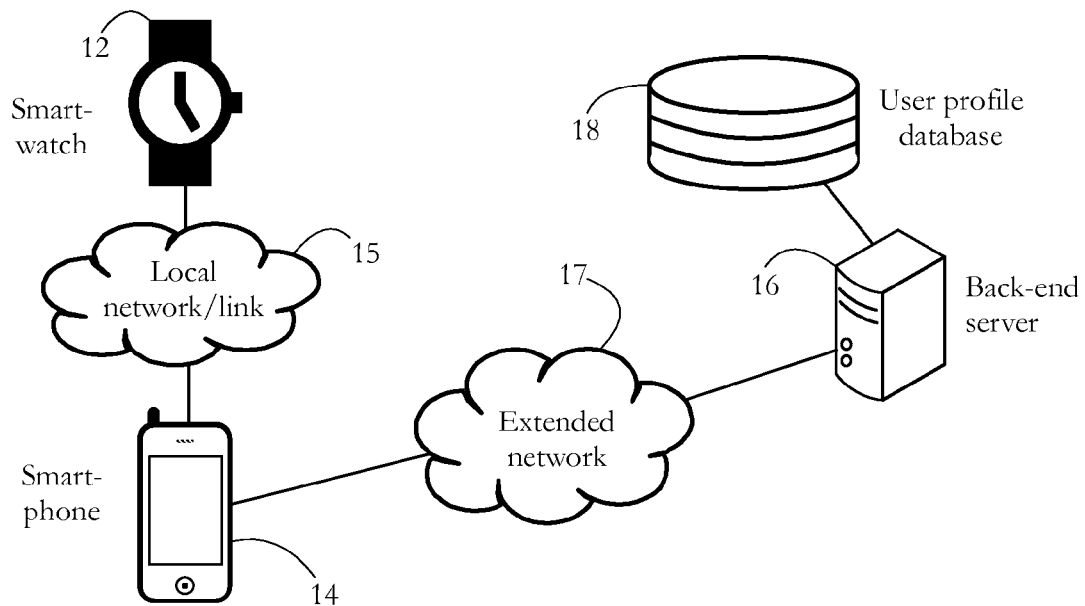
FIG. 1 shows an exemplary configuration wherein a smartwatch collaborates with a smartphone to determine a user context according to some embodiments of the present invention.

FIG. 1 shows a system for determining a user activity context according to some embodiments of the present invention. In some embodiments, a user activity context represents a current activity of a user (e.g., office work, work meeting, sleeping, walking, running, driving, etc.). The user activity context may further represent a current time of the day (e.g., exact time, morning, lunch, working hours, etc.) and/or a current physical location of the user (e.g., home, office, room of the house, park, country, latitude, longitude, etc.). Exemplary complex activity contexts combining multiple such criteria include, among others, "dressing up in the morning", "walking at the office", "running in the park during lunch break". In some embodiments of the present invention, determining the user activity context comprises correlating motion data collected and/or computed on multiple devices such as a smartwatch and a smartphone, among others.

The illustrated context-detecting system comprises a smartwatch 12, a smartphone 14, and a back-end server 16. Smartwatch 12 is communicatively coupled to smartphone 14 via a local computer network/telecommunication link 15. Exemplary networks/links 15 include a local area network (LAN) enabled using wireless communication devices/protocols, and a Bluetooth® link, among others. Smartphone 14 is further coupled to back-end server 16 via an extended network 17, such as the Internet. Parts of extended network 17 may also include a LAN. In some embodiments, smartwatch 12 uses smartphone 14 as a vehicle for transmitting data to and/or receiving data from server 16, as shown below.

In some embodiments, server 16 is communicatively coupled to a user profile database 18, which may store a plurality of profile entries corresponding to various individual users. A profile entry may include, among others, identification and/or contact data for the respective user, a list of contacts (address book), a set of calendar events, a set of predetermined locations (e.g., home, office), health and/or fitness data for the respective user, etc. In some embodiments, a profile entry may include data determined automatically for the respective user, such as normal activity patterns, exercise patterns, sleep patterns, frequently visited locations, etc. Such data may be harvested automatically from sensors within smartphone 14 and/or smartwatch 12, and may be further processed using data mining or automatic classification techniques.

Figure 2:
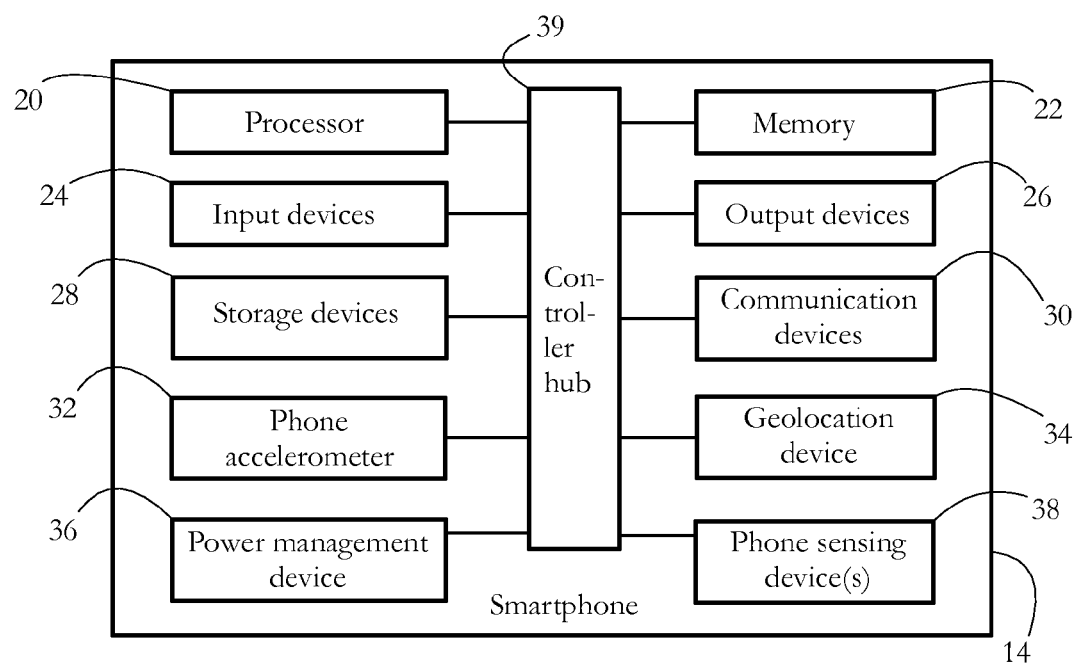
FIG. 2 shows an exemplary hardware configuration of a smartphone according to some embodiments of the present invention.

FIG. 2 shows an exemplary hardware configuration of smartphone 14. In some embodiments, smartphone 14 comprises a mobile computing device configured to exchange data with a remote computer system over a telecommunication network. Such exchanged data may include, among others, an encoding of a user's voice, as occurring during a telephone conversation. Exemplary smartphones include mobile telephones and tablet computers, among others. The illustrated smartphone configuration comprises a processor 20, a memory unit 22, a set of input devices 24, a set of output devices 26, a set of storage devices 28, and a set of communication devices 30, all connected to a controller hub 39. Smartphone 14 may further include a phone accelerometer 32, a geolocation device 34, a power management device 36, and a set of sensing devices 38, connected to hub 39. In some embodiments, such as system-on-a-chip configurations, some or all of the devices illustrated in FIG. 2 may be integrated into a common hardware device, for instance, an integrated circuit.

In some embodiments, processor 20 comprises a physical device (e.g. multi-core integrated circuit formed on a semiconductor substrate) configured to execute computational and/or logical operations with a set of signals and/or data. In some embodiments, such logical operations are delivered to processor 20 in the form of a sequence of processor instructions (e.g. machine code or other type of software). Memory unit 22 may comprise volatile computer-readable media (e.g. RAM) storing data/signals accessed or generated by processor 20 in the course of carrying out instructions. Input devices 24 may include touchpads, keyboards, mice, and microphones, among others, including the respective hardware interfaces and/or adapters allowing a user to introduce data and/or instructions into smartphone 14. Output devices 26 may include speakers and display devices such as a screen, as well as hardware interfaces/adapters such as graphic cards, allowing smartphone 14 to communicate information to the user. In some embodiments, input devices 24 and output devices 26 may share a common piece of hardware, as in the case of touch-screen devices. Storage devices 28 include computer-readable media enabling the non-volatile storage, reading, and writing of software instructions and/or data. Exemplary storage devices 28 include flash memory devices and magnetic and optical disks, as well as removable media such as memory cards, CD and/or DVD disks and drives. Communication devices 30 enable smartphone 14 to connect to local network/link 15, extended network 17, and/or to other devices/computer systems. Communication devices 30 may enable a plurality of carrier media and protocols. For instance, devices 30 may include Ethernet adapters, wireless modems, and Bluetooth® modems, among others.

Geolocation device 34 may include hardware enabling smartphone 14 to receive and/or process signals indicative of a physical location of smartphone 14. Such signals may include signals from a Global Positioning System (GPS) satellite. Power management device 36 may include batteries and hardware configured to supervise battery charging and power consumption by various subsystems of smartphone 14. Examples of sensing devices 38 include a temperature sensor, and an ambient light sensor, among others. Controller hub 39 collectively represents the plurality of system, peripheral, and chipset buses, and/or all other circuitry enabling the inter-communication of devices 20-38 of smartphone 14. For instance, controller hub 39 may include a memory management unit (MMU) configured to enable and/or control access by processor 20 to memory unit 22 and to perform memory address translation.

In some embodiments, phone accelerometer 32 comprises hardware configured to acquire and process signals indicative of an acceleration of smartphone 14. An exemplary accelerometer 32 may measure a force experienced by smartphone 14, either due to external causes (e.g., gravity) or inertial, i.e., due to the motion of smartphone 14. Phone accelerometer 32 may be embodied in any manner known in the art, for instance using piezoelectric, capacitive, or micro electro-mechanical systems (MEMS). In some embodiments, accelerometer 32 allows a determination of acceleration components along multiple axes, and/or a determination of a spatial orientation of smartphone 14 with respect to such axes.

Figure 3:
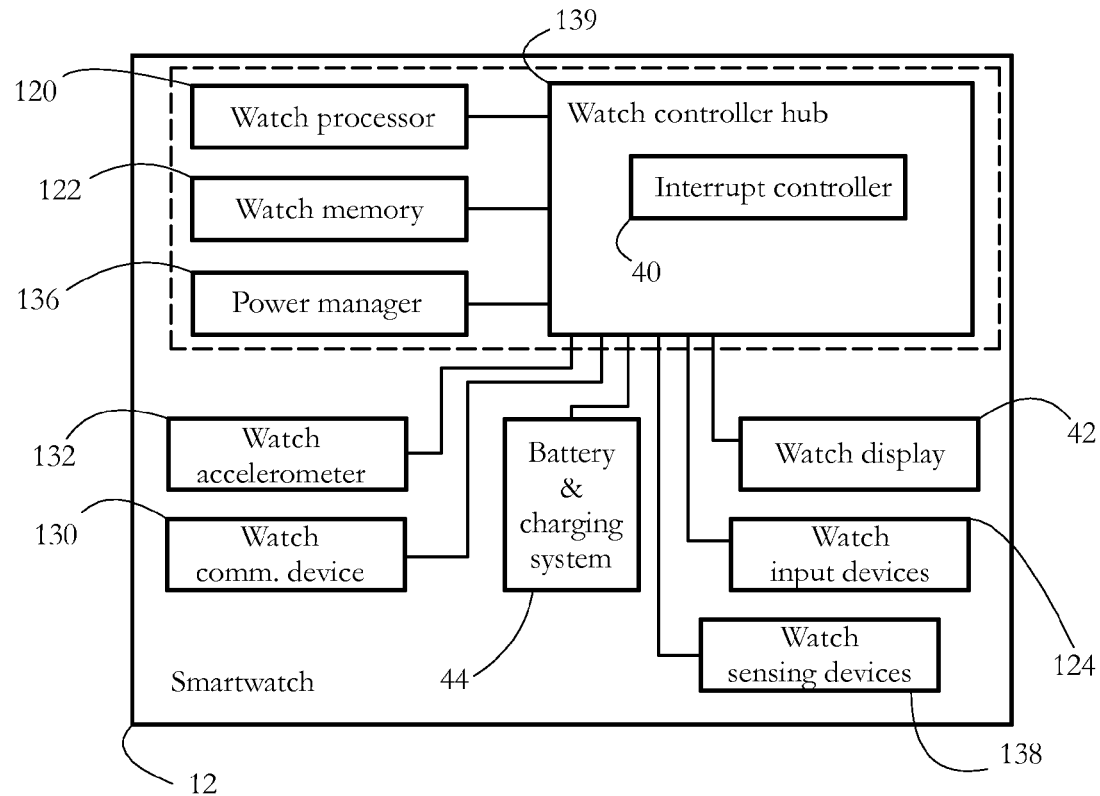
FIG. 3 illustrates an exemplary hardware configuration of a smartwatch according to some embodiments of the present invention.

FIG. 3 shows an exemplary hardware configuration of smartwatch 12. In some embodiments, smartwatch 12 comprises a wearable computing device configurable to display the current time, smartwatch 12 wearable primarily attached to the user's wrist. Exemplary smartwatches 12 include watches, fitness bands, and electronic jewelry, among others. The exemplary hardware configuration of FIG. 3 includes a watch processor 120, a watch memory 122, and a watch power manager 136, all interconnected via a watch controller hub 139. Processor 120 may comprise an integrated circuit configured to execute computational and/or logical operations with a set of signals and/or data. Memory unit 122 may comprise volatile computer-readable media (e.g. RAM) storing data/signals accessed or generated by processor 120 in the course of carrying out computations. In some embodiments, processor 120 may operate at variable clock speed, and may be configurable to switch from one clock speed to another, for instance so that various computation tasks are carried out at distinct clock speeds. In one such example, computationally-intensive and/or time-sensitive tasks requiring a quick response may execute at relatively high processor clock speed, while other tasks such as display refreshing and administrative tasks may execute at relatively low clock speed. Such switching may save battery, since clock speed typically correlates positively with power consumption. In some embodiments, power manager 136 is configured to select a clock speed for processor 120, and/or to switch processor 120 between a sleep state and an active state. The sleep state may comprise a state wherein some hardware devices (e.g., display, sensors) are powered off, and wherein execution of processor 120 is suspended. Exemplary sleep states include Advanced Configuration and Power Interface (ACPI) states S1-S4 of a computer system. The active state may comprise a state wherein processor 120 performs computation at a selected clock speed, and wherein hardware devices are powered. An exemplary active state is the ACPI state S0 of a computer system.

In some embodiments, smartwatch 12 further includes a watch display 42, a set of watch input devices 124, a watch communication device 130, and a set of watch sensing devices 138. Display 42 includes a physical device (e.g., liquid crystal display, light-emitting diode array) usable to communicate visual information to the user of smartwatch 12. Input devices 124 may include a button, crown, or other device enabling the user to input data into smartwatch 12 and/or to select an operating mode of smartwatch 12. In some embodiments, display 42 is integrated with input devices 124 into a touchscreen device. Communication devices 130 may include hardware/logic and software interfaces enabling smartwatch 120 to exchange data with other devices, for instance, to connect with smartphone 14 over local network/link 15. Communication devices 130 may operate according to communication protocols such as, for instance, Bluetooth®. Watch sensing devices 138 include hardware configured to collect and/or process signals indicative of the environment of smartwatch 12. Some exemplary sensing devices 138 include, among others, a heart rate sensor, an infrared light sensor, an ambient light sensor, and a skin conductivity sensor.

Smartwatch 12 may further include a battery and charging system 44 comprising hardware configured to manage charging and power consumption. System 44 may include a solar cell, a kinetic energy convertor, or any other device configured to transform an external energy source into electricity for the purpose of charging the battery of smartwatch 12.

Smartwatch 12 may further include a watch accelerometer 132, comprising hardware and software configured to acquire and process a signal indicative of an acceleration or force experienced by smartwatch 12. In some embodiments, watch accelerometer 132 allows a determination of acceleration components along multiple axes, and/or a determination of a spatial orientation of smartwatch 14 with respect to such axes.

Controller hub 139 represents the plurality of system, peripheral, and/or other circuitry enabling the inter-communication of hardware devices of smartwatch 12. Hub 139 may include a memory manager configured to enable access of processor 120 to memory unit 122, and an interrupt controller 40 configured to receive and manage hardware interrupts received by processor 120 from peripheral devices such as communication device 130 and accelerometer 132, among others. In some embodiments, some hardware devices of smartwatch 12 may be integrated onto a common integrated circuit. For example, processor 120 may be integrated with memory 122 and with parts of controller hub 139 onto a single chip (e.g., dashed contour in FIG. 3).

Figure 4:
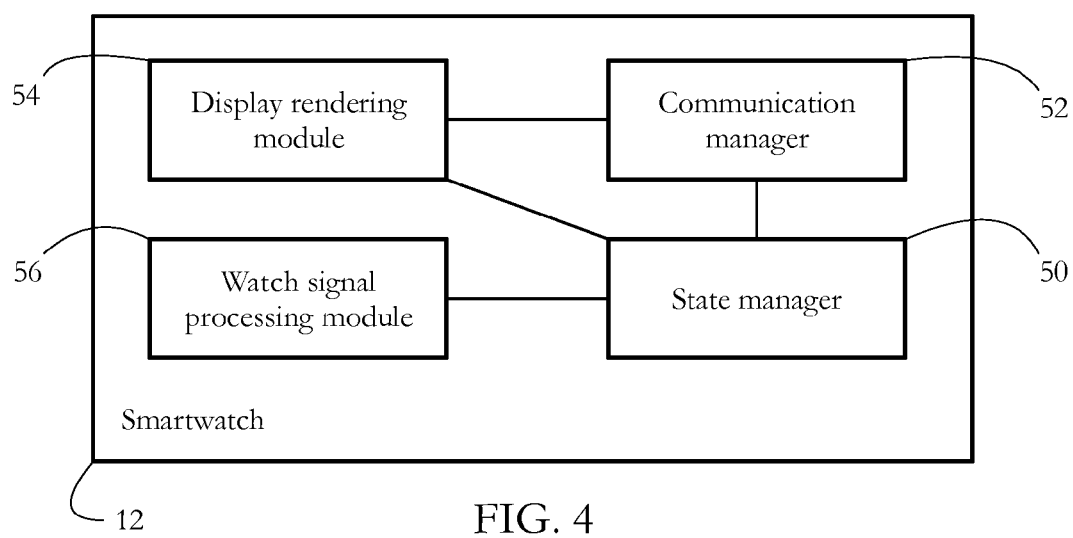
FIG. 4 shows exemplary software modules executing on the smartwatch according to some embodiments of the present invention.

FIG. 4 shows an exemplary set of software modules executing on smartwatch 12 according to some embodiments of the present invention. The set includes a watch signal processing module 56, a display rendering module 54, and a communication manager 52, all connected to a state manager 50. In some embodiments, smartwatch 12 operates as a state machine, switching among a plurality of distinct states and/or operation modes. Each such state and/or operation mode may carry out a specific action (e.g., display specific information, acquire specific measurements, process acquired data in a specific manner, etc.). Some states/operation modes may be associated with particular user activity contexts, for instance, running, walking at the office, talking on the phone on the bus. In some embodiments, state manager 50 is configured to identify the current context of the user, and to select an operation mode according to the respective context. To determine the current activity context, state manager 50 may collaborate with watch signal processing module 56, and may receive context-indicative data from smartphone 14. Such context detection will be further detailed below. State manager 50 may also switch smartwatch 12 among various states/operation modes.

In some embodiments, communication manager 52 manages communication between smartwatch 12 and smartphone 14. For instance, communication manager 52 may send and/or receive data (e.g. manage a Bluetooth® stack), and may configure connection parameters (e.g., Bluetooth® link parameters). Signal processing module 56 may process data/signals received from watch accelerometer 132 and/or other sensing device. Such processing may include, among others, compressing such signals, filtering such signals (e.g., low-pass), numerically integrating such signals, determining a frequency representation (e.g., a Fourier transform) or a time-frequency representation (e.g., wavelet) of such signals.

In some embodiments, display rendering module 54 manages watch display 42, controlling a timing, a content, and a manner of presentation of the respective content. The displayed content may include, among others, indicators of the time of day, current or forecast weather data, calendar events, contacts (address book), as well as other type of information such as fitness-related data, maps, stock market indicators, etc. The displayed information and/or manner of presentation may differ from one operation mode of smartwatch 12 to another. For instance, the displayed content may depend on a current user activity context of the wearer. In one such example, smartwatch 12 may determine that the user is currently dressing up for work, and in response, display the calendar of the day and/or the weather forecast for the respective day. In another example, smartwatch 12 may determine that the user is currently running in a park, and in response, display a count of steps and calories consumed, and/or a progress indicator indicative of the degree of accomplishment of a predetermined fitness goal.

In some embodiments, display rendering module 54 is configured to present the displayed data in a format indicated by a display template. The display template may indicate a set of regions (e.g. a subset of pixels) of watch display 42, each region acting as a placeholder for a particular type of object (e.g., text, image, drawing, etc.). The display template may further include a set of graphical objects (e.g., bitmaps) configured to fit within the respective placeholders. Examples of such graphical objects include an image of a watch hand, an image of a weather symbol (e.g., snowflake, cloud), and a calendar event icon, among others. Smartwatch 12 may use multiple display templates, e.g., the template may change from one state/operation mode to another. During operation of smartwatch 12, display rendering module 54 may select an appropriate display template, instantiate the respective template with current data (e.g., current time, current calendar entries), and configure the hardware of watch display 42 to render the instantiated display template.

Figure 5:
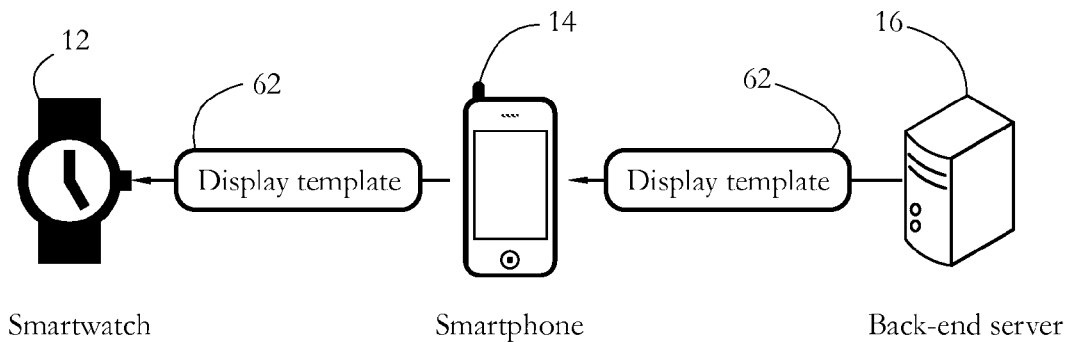
FIG. 5 shows the smartwatch receiving a display template from a back-end server via the smartphone, according to some embodiments of the present invention.

In some embodiments, display templates are customizable, for instance by the user of smartwatch 12. Such customization may be enabled via a web interface exposed, for instance, by back-end server 16. In one such example, a user may be allowed to select a template from a gallery of pre-designed templates, or to design a custom template indicating what information is displayed in each operation mode of smartwatch 12, and in which manner. The respective display template may then be transmitted to smartwatch 12, for instance using a push protocol. FIG. 5 shows an exemplary display template 62 transmitted from back-end server 16 to smartwatch 12, using smartphone 14 as a communication vehicle.

Figure 6:
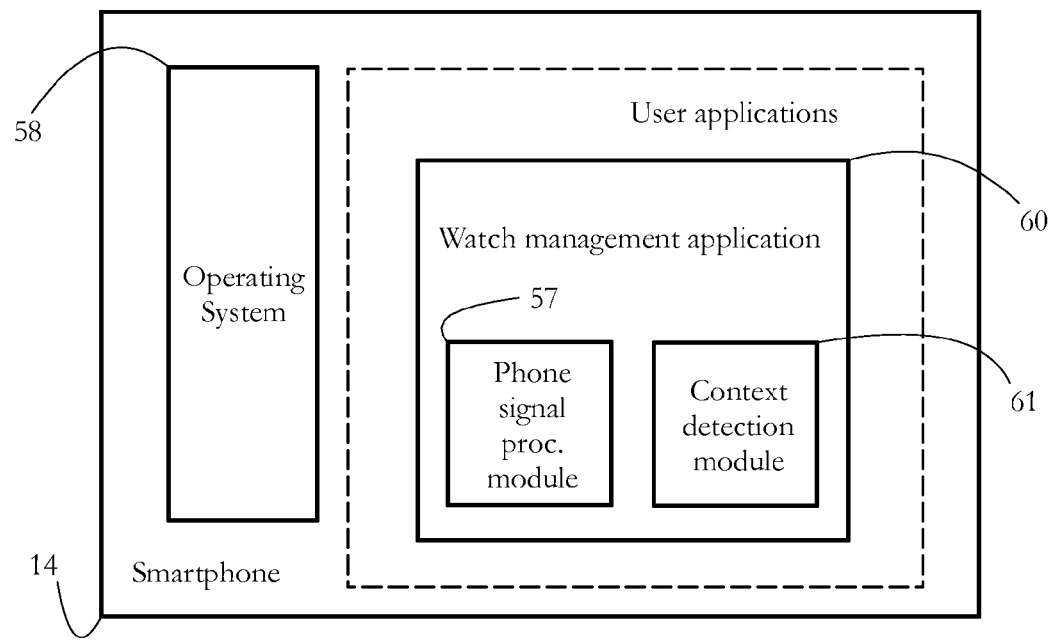
FIG. 6 shows exemplary software components executing on the smartphone according to some embodiments of the present invention.

FIG. 6 shows an exemplary set of software objects executing on smartphone 14 according to some embodiments of the present invention. Smartphone 14 executes an operating system (OS) 58 providing an interface between the hardware of smartphone 14 and a set o user applications. OS 58 may comprise any widely available operating system such as iOS®, Android®, and Windows®, among others.

User applications may include browser, calendar, image acquisition, image processing, database, productivity, electronic communication (e.g., email, instant messaging), entertainment (e.g., media player, gaming), social media (e.g., Facebook), mapping/navigation, online banking, and online shopping applications, among others. In some embodiments, smartphone 14 operates a watch management application 60 configured to interact with smartwatch 12, for instance to detect a user activity context and/or to send/receive data to/from smartwatch 12. Application 60 may include a phone signal processing module 57 and a context detection module 61, among others. In some embodiments, signal processing module 57 may perform calculations with a signal acquired from a sensing device (e.g., an accelerometer) of smartphone 14 or smartwatch 12. Such calculations may include determining a range of the signal, performing a numerical integration of the signal, filtering the signal, and determining a frequency representation (e.g., Fourier transform), among others. Context detection module 61 may determine a user activity context, according to data measured by sensors on smartphone 14 and/or smartwatch 12.

Figure 7:
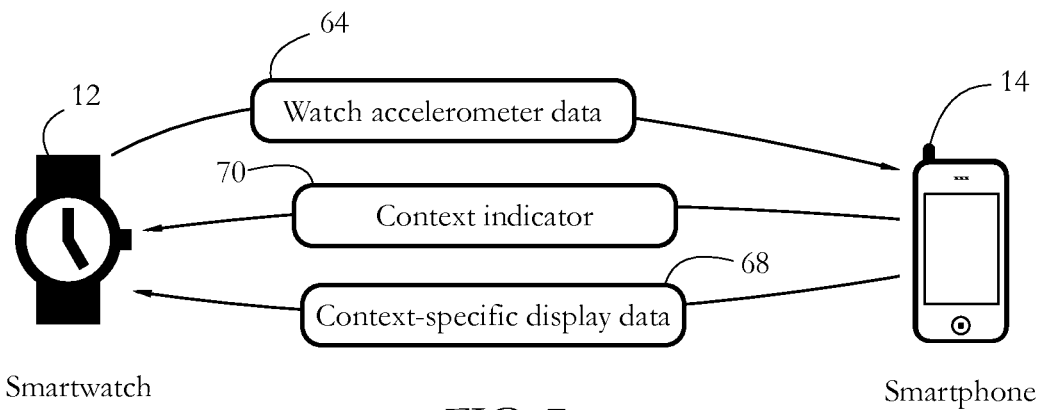
FIG. 7 shows an exemplary data exchange between the smartphone and the smartwatch, in an embodiment of the present invention wherein context detection is performed on the smartphone.

In some embodiments, context detection is performed primarily by software executing on smartphone 14. Smartphone 14 may determine the user activity context by correlating the motion of the smartwatch with the motion of the smartphone, and possibly with other indicators, such as the current time and/or the current physical location of the user. FIG. 7 shows an exemplary data exchange occurring in such embodiments. Such configurations have the advantage that computationally intensive tasks are carried out primarily by processor 20 of smartphone 14, which is typically more powerful than processor 120 of smartwatch 12. Doing computation on smartphone 14 may therefore produce a quick result, while also keeping the energy consumption of smartwatch 12 low, extending the period between consecutive battery charges.

To determine a user activity context, smartphone 14 may receive a set of watch accelerometer data 64 from smartwatch 12. In response, smartphone 14 may transmit a context indicator 70 indicative of the current activity context to smartwatch 12. Watch accelerometer data 64 may include a time series of acceleration values measured by watch accelerometer 132. When accelerometer 132 allows measurements of the acceleration along several individual axes, data 64 may include such axis-specific acceleration measurements. In some embodiments, accelerometer data 64 may include a time series of absolute values of the acceleration, e.g., $$\alpha^2(t)=\alpha_x^2(t)+\alpha_y^2(t)+\alpha_z^2(t), \qquad [1]$$

wherein $\alpha_x$, $\alpha_y$, and $\alpha_z$ are the measured accelerations along the x, y, and z axes, respectively. In some embodiments, smartwatch 12 compresses accelerometer data 64 before transmitting data 64 to smartphone 14. Compression may substantially reduce the size of the transmission, thus extending battery life. In some embodiments, smartwatch 12 may pre-process accelerometer data, to determine a watch motion indicator which may include, for instance, a range of an acceleration signal, a dominant frequency of the acceleration signal, etc. (such motion indicators are further detailed below). Motion indicators may be sent to smartphone 14 as part of, or instead of accelerometer data 64.

Figure 8:
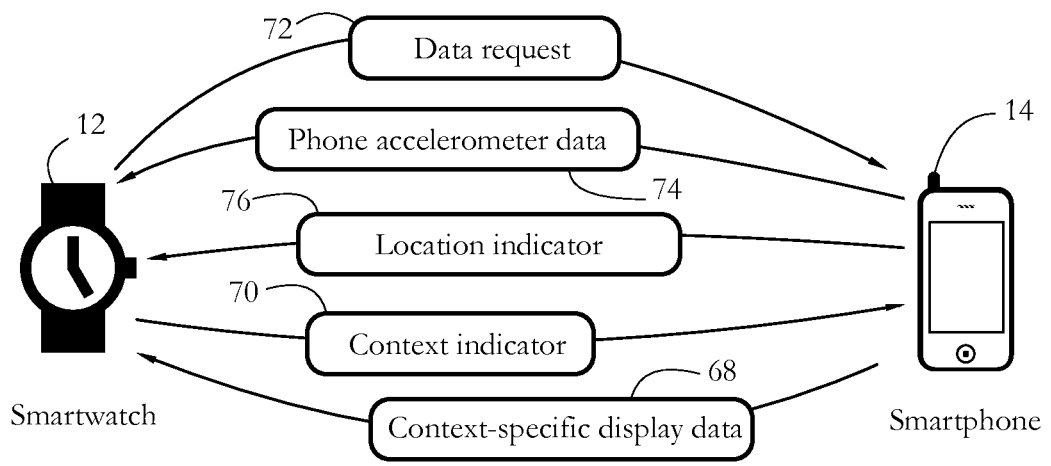
FIG. 8 shows an exemplary data exchange between the smartphone and the smartwatch, in an embodiment of the present invention wherein context detection is performed on the smartwatch.

In some embodiments, context detection is carried out primarily on smartwatch 12. FIG. 8 shows an exemplary data exchange occurring in such a case. To be able to correlate the motion of the smartwatch with the motion of the smartphone, smartwatch 12 may send a data request 72 to smartphone 14, to request motion data. In response, smartphone 14 may transmit phone accelerometer data 74 to smartwatch 12, together with a location indicator 76 indicative of the current physical location of smartphone 14. Location indicator 76 may include, for instance, a set of coordinates determined by geolocation device 34 (FIG. 2). In response to determining the user activity context, smartwatch 12 may transmit context indicator 70 to smartphone 14.

Figure 9:
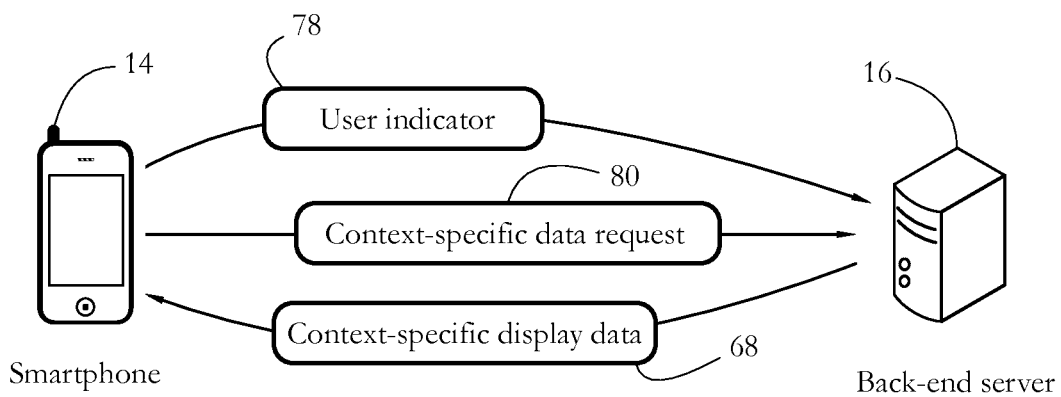
FIG. 9 illustrates an exemplary data exchange between the smartphone and the back-end server to transfer context-specific display data according to some embodiments of the present invention.

When operating in certain states/operation modes, smartwatch 12 may display specific information, such as a list of calendar event entries for the current day, a weather forecast, a fitness goal of the user, etc. In some embodiments, such data may reside on back-end server 16 and/or within user profile database 18 (FIG. 1). To be able to display the respective information, smartwatch 12 may therefore need to receive it from back-end server 16. In some embodiments, smartphone 14 may obtain a set of context-specific display data 68 from server 16. One such exemplary data exchange is illustrated in FIG. 9. Smartphone 14 may send a user indicator 78 identifying the respective user, and a data request 80 formulated according to the current user activity context, to back-end server 16. In response to receiving context-specific display data 68, smartphone 14 may transmit display data 68 to smartwatch 12 (FIGS. 7-8).

In some embodiments, in certain states/operation modes, smartwatch 12 and/or smartphone 14 may collect context-specific information. Such information may be used, for instance, to automatically determine a profile for the respective user, e.g., to determine normal activity patterns, frequently visited locations (e.g., home, office), etc. In another example, in response to determining that the user is running, smartwatch 12 and/or smartphone 14 may start counting steps, in order to report to the user a running distance, step count, and/or calorie count. Such data may be further transmitted to back-end server 16 for processing.

Figure 10:
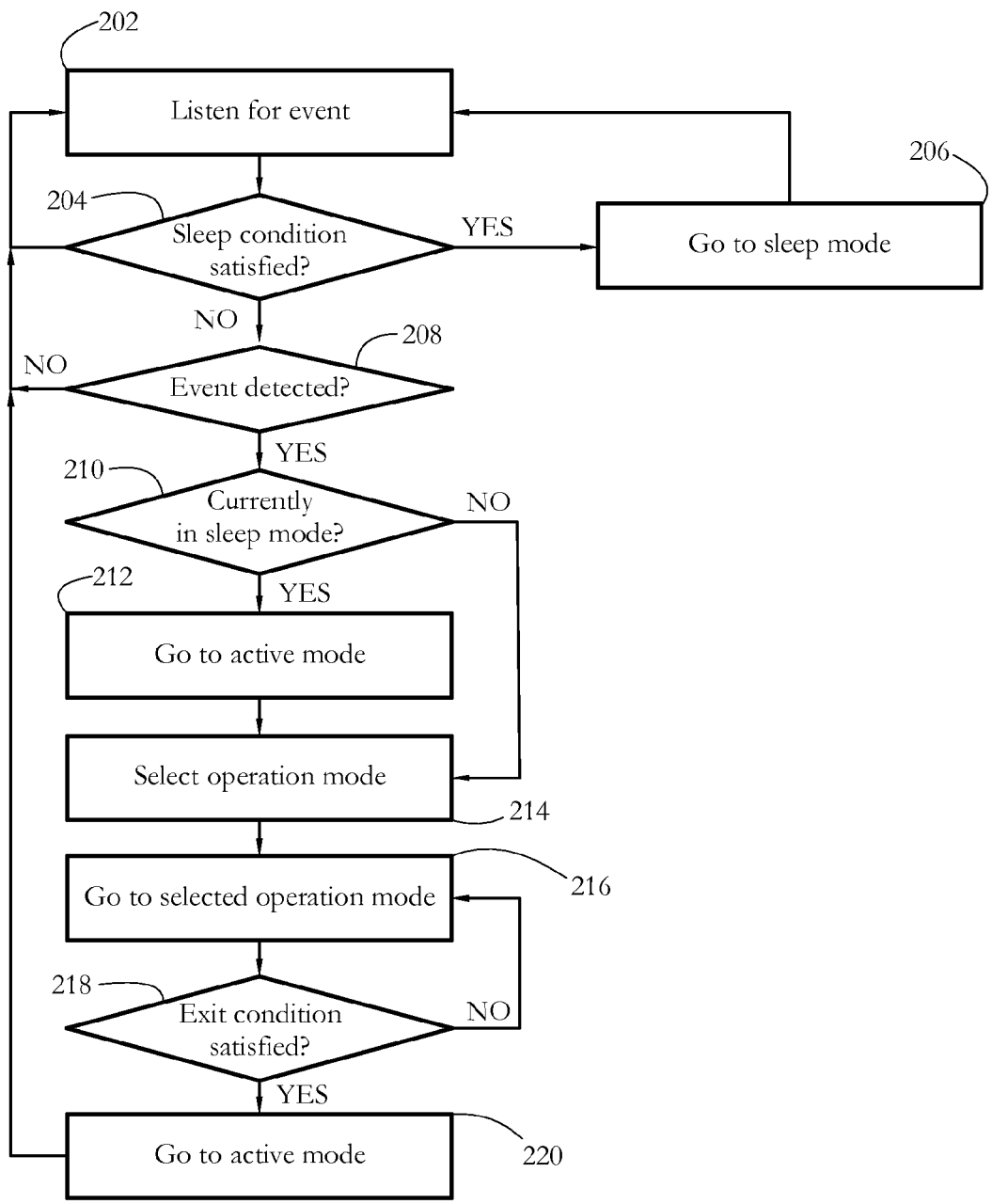
FIG. 10 shows an exemplary sequence of steps performed by a state manager module of the smartwatch according to some embodiments of the present invention.

FIG. 10 shows an exemplary sequence of steps performed by smartwatch 12 (e.g., by state manager 50 in FIG. 4) according to some embodiments of the present invention. To minimize energy consumption and thus extend the time period between two consecutive charges, the default state/operation mode of smartwatch 12 may be a sleep state. In an exemplary sleep state, most peripheral devices are in standby or are powered off, memory unit 122 is powered, while processor 120 is halted but may be powered to maintain processor state. A set of steps 202-204-206 ensures that smartwatch 12 returns to the sleep state when a sleep condition is satisfied. An exemplary sleep condition comprises not detecting any hardware event for an extended time period (e.g., t>1 second).

When an event is detected (step 208), a step 210 determines whether smartwatch 12 is currently in the sleep state. When yes, in a step 212, state manager 50 may switch smartwatch 12 to an active state/operation mode. In some embodiments, in the active state, processor 120 is powered and executing, and most peripheral devices are powered. Several types of hardware events may wake up smartwatch 12. Hardware events may trigger a system wake-up by injecting an interrupt into processor 120, the interrupt detected by interrupt controller 40 (FIG. 3). One event type may include scheduled events, such as events related to timekeeping and the display of the current time. In some embodiments, the display must be refreshed at regular time intervals (e.g., every minute, every second), for instance to update the position of a watch hand. An internal clock of smartwatch 12 may generate an interrupt with a predetermined periodicity, e.g., a predetermined count of clock tics. Another type of events includes detecting a user input, for instance detecting that the user has pressed a button therefore requesting that smartwatch switches to a specific state/operation mode (e.g., fitness mode, calendar mode, address book mode, etc.). Such events may be detected via a hardware interrupt generated by watch input devices 124. Another type of events triggering wake-up includes receiving a communication from smartphone 14, in which case watch communication device 130 may inject an interrupt into processor 120. Yet another type of event comprises detecting a movement of smartwatch 12. In some embodiments, motion detection is achieved using a signal received from watch accelerometer 132. When the accelerometer signal exceeds a pre-determined threshold, indicating that the watch is moving significantly, accelerometer 132 may generate a hardware interrupt and thus wake up processor 120.

In a step 124, state manager 50 may select a state/operation mode, for instance according to a type of event detected in step 208. State selection is further illustrated below, in relation to FIG. 11. In a step 208, smartwatch 12 enters the selected operation mode. Each such operating mode may include specific functionality, for instance, to display specific information (e.g., a running distance, a map), to collect specific data (e.g., to count steps), to initiate a data exchange with smartphone 14, etc. Some operation modes may be context-specific, i.e., may be selected according to, and in response to, determining a current user activity context.

In some embodiments, the selected operation mode may be maintained as long as an exit condition is not satisfied (step 218 in FIG. 10). An exemplary exit condition comprises completing a task specific to the respective operation mode. In another example, smartwatch 12 may automatically exit the selected operation mode after a pre-determined time period (e.g., 5 seconds). When the exit condition is satisfied, in a step 220, state manager 50 may switch smartwatch 12 to the generic active mode.

Figure 11:
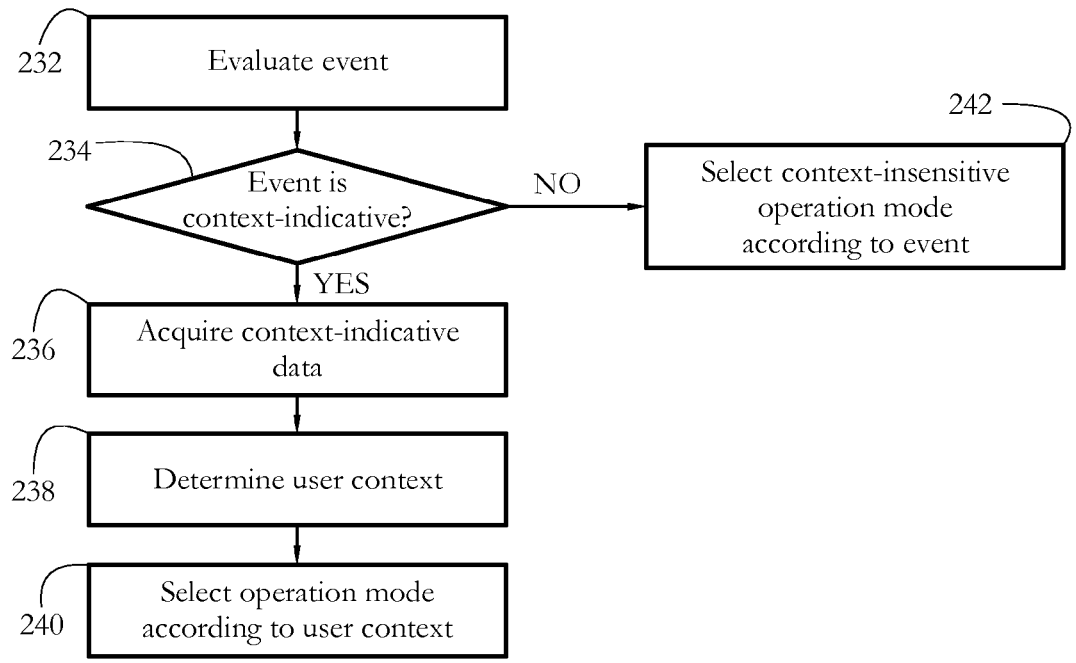
FIG. 11 illustrates an exemplary sequence of steps performed by the state manager module to select an operation mode according to some embodiments of the present invention.

FIG. 11 shows an exemplary sequence of steps performed by state manager 50 to select a state/operation mode of smartwatch 12 (step 214 in FIG. 10), in response to detecting a hardware event. A sequence of steps 232-234 may evaluate the event, to determine whether the respective event is context-indicative. In some embodiments, context-indicative events include detecting a movement of smartwatch 12, receiving user input (e.g., a button press), and receiving a communication from smartphone 14, among others. When the detected event is not indicative of context (e.g., when the event is related to refreshing the display), in a step 242, state manager 50 may select a context-insensitive operation mode according to the respective event.

When the event is context-indicative, in a step 236, state manager 50 may receive/acquire context-indicative data (e.g., watch motion indicators from accelerometer 132). In an embodiment wherein context detection is performed primarily on the smartwatch, step 236 may include requesting and/or receiving phone motion indicators and/or location indicators from smartphone 14 (e.g. FIG. 8). In a step 238, state manager 50 may determine a current user activity context according to phone and watch motion indicators, and according to a location indicator received from smartphone 14. In an embodiment wherein context is determined primarily on the smartphone, step 238 includes receiving context indicator 70 from smartphone 14 (FIG. 7). In response to determining the user activity context, in a step 240, state manager 50 selects a state/operation mode according to the respective context.

Figure 12:
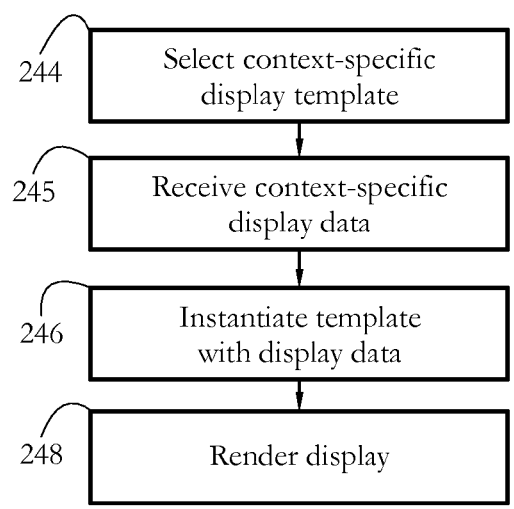
FIG. 12 illustrates an exemplary sequence of steps performed by the state manager in a context-specific operating mode of the smartwatch, according to some embodiments of the present invention.

FIG. 12 shows an exemplary sequence of steps performed by smartwatch 12 in a context-specific state/operation mode, according to some embodiments of the present invention. The sequence illustrates a case wherein the respective operation mode comprises displaying a particular kind of information. In one such example, in response to determining that the user is at home, preparing to go to work, the smartwatch 12 may switch from displaying the current time to displaying a list of calendar events (e.g., meetings) for the current day. In a step 244, state manager 50 may select a display template specific to the respective context (for the current example, a calendar event template). A step 245 receives context-specific display data from server 16 (e.g., meeting data for the current day). Next, in steps 246-248, state manager 50 may instantiate the selected template with the received display data, and instruct display rendering module 54 to refresh the display.

FIG. 13-A illustrates an exemplary sequence of steps performed by smartwatch 12 and/or smartphone 14 to determine the user activity context, in an embodiment wherein such determination is performed primarily by smartphone 14. The illustrated sequence may replace, for instance, step 238 in FIG. 11. In a sequence of steps 252-254, smartwatch 12 may pre-process (e.g. compress) and transmit watch accelerometer data 64 to smartphone 14 over local network/link 15. In response to receiving data 64, in a step 262, smartphone 14 may collect phone motion data 262 from accelerometer 32. Next, in a sequence 264-266, signal-processing module 57 (FIG. 6) may process watch and phone accelerometer data to determine watch and phone motion indicators, respectively. Such motion indicators may include, among others, an indicator indicative of whether the motion is periodic, an indicator indicative of a degree of synchronization between the motion of smartphone 14 and smartwatch 12, and a frequency representation (e.g., power spectrum) of the watch and/or phone accelerometer data. The determination of motion indicators will be further detailed below, in relation to FIG. 17.

In a step 268, context-detection module 61 may request from geolocation device 34 a location indicator (e.g., GPS coordinates) indicative of the current position of smartphone 14. In a step 270, module 61 may determine the current user activity context by correlating motion indicators for the phone and watch with the location indicator and possibly with the current time. Several examples of such user activity contexts and of a method of correlating motion data with location and time indicators are given below.

Figure 14:
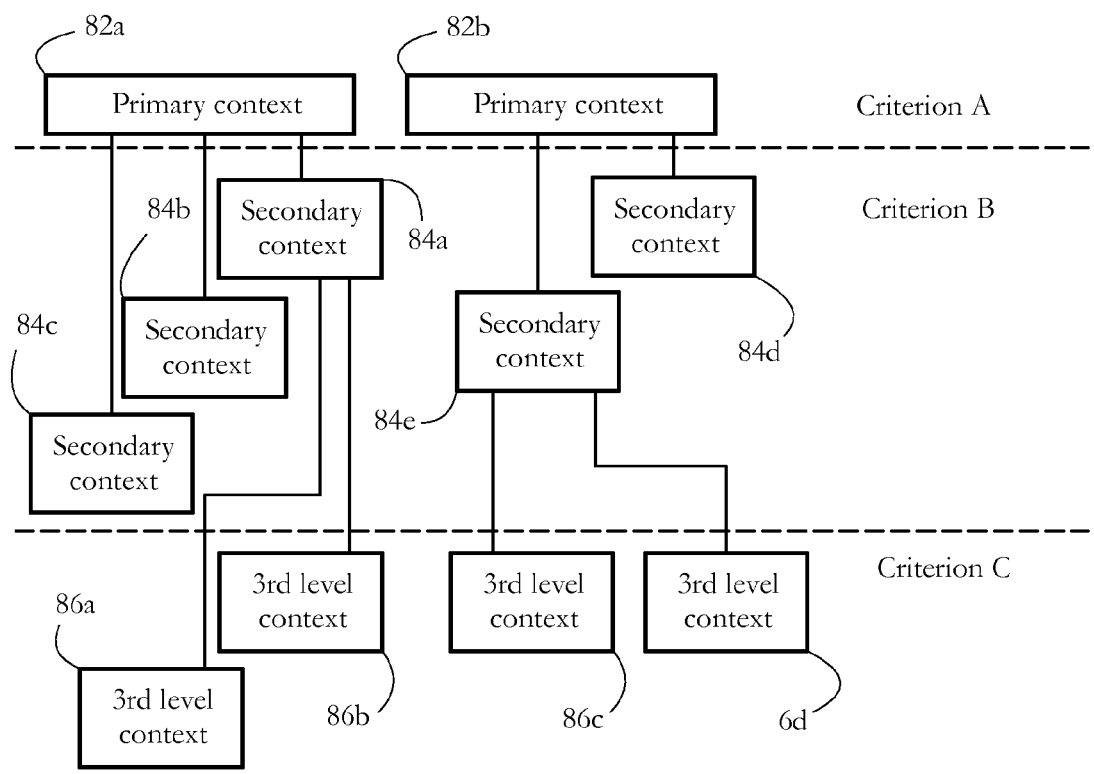
FIG. 14 illustrates an exemplary context hierarchy according to some embodiments of the present invention.

In some embodiments, a user activity context may represent a time, a location, a class of activities of the user, or any combination thereof. Context may also be hierarchic. In one such example, illustrated in FIG. 14, the current user activity context may include a primary context indicator 82$a$-$b$, determined according to a first criterion. In an embodiment wherein the first criterion is the time of the day, primary context indicators 82$a$-$b$ may correspond, for instance, to "Morning", "Working hours", "Lunch break", "After hours", "Night", etc. A primary context may have a set of possible secondary contexts, determined according to a second criterion. In the example of FIG. 14, primary context 82$a$ has a set of possible secondary contexts 84$a$-$c$. In an embodiment wherein the second criterion is location, contexts 84$a$-$c$ may represent, for instance, "Home", "Office", "Out of town", respectively. A secondary context, such as 84$a$ may in turn have a set of possible $3^{rd}$ level contexts 86*a-b*, determined according to a third criterion. In some embodiments, the third criterion is motion. Accordingly, exemplary 3$^{rd}$ level contexts 86*a-b* may include, among others, "Working", "Walking", "Running", "Driving", "Bicycling", "Public Transportation", and "Telephone in hand". Other exemplary 3$^{rd}$ level contexts may differ according to the current position of devices 12 and/or 14 with respect to each other, and/or with respect to the user's body. For instance, one context may correspond to the phone currently being in the hand that also carries the watch. Another context may consist in the phone being in the user's pocket or bag/purse. Another context may consist in the phone currently being carried in the other hand than the one carrying the watch. Yet another context may consist in the phone currently lying on a fixed surface (e.g., table, desk, nightstand).

Some user activity contexts may be mutually exclusive (e.g., at home vs. at the office), while others may overlap (e.g., walking, telephone in hand). In some embodiments, exemplary context indicators combining the illustrated three context levels include "running in the park during lunch break", "dressing at home in the morning", "walking at the office during working hours", etc. The context hierarchy may be determined automatically, e.g., by back-end server 16, according to information collected about the user's daily patterns of activity. The context hierarchy may also be configured explicitly by the user, for instance via a web interface managed by server 16.

In some embodiments, context determination comprises identifying a current user activity context from a plurality of pre-defined possible activity contexts (e.g., FIG. 4), according to time, location, and motion indicators of smartwatch 12 and smartphone 14. Each pre-defined user activity context may correspond to a particular range and/or combination of values of such parameters. Therefore, identifying the user activity context may include, for instance, matching a current value of a time, location, and/or motion indicator to such predefined ranges/combinations. Such matching may be performed automatically, using any suitable data classification or pattern matching algorithm known in the art. Exemplary embodiments may use decision maps, neural network classifiers, and/or fuzzy logic algorithms to match current values of time, location, and motion indicators to a user activity context.

In a step 272 (FIG. 13-A), smartphone 14 may transmit context indicator 70 to smartwatch 12. In some embodiments, in a further step 276, smartphone 14 may perform a context-specific action. Such actions may include, for instance, modifying the display and/or other functionality of smartphone 14 in response to detecting a specific user activity context. In one such example, in response to determining that the user is in a meeting, smartphone 14 may automatically set the ringer volume to low, or to mute. In another example, smartphone 14 may turn off notifications (e.g., from email or other messaging applications) during certain time intervals, to allow the user to concentrate on work. In yet another example, in response to determining that smartphone 14 is currently lying face-down on a fixed surface (e.g., table, desk), smartphone 14 may send notifications to smartwatch 12, instead of displaying such notifications on the screen of smartphone 14. In contrast, when detecting that smartphone 14 is currently lying face-up, smartphone 14 may intercept and display all notifications on a screen of smartphone 14, thus preventing the display of such notifications by smartwatch 12.

FIG. 13-B shows an exemplary sequence of steps performed by smartwatch 12 and/or smartphone 14 to determine the user activity context, in an embodiment wherein such determination is performed primarily by smartwatch 12. In a step 282, smartwatch 12 may use signal processing module 56 to determine watch motion parameters by analyzing watch accelerometer data. In a step 284, smartwatch 12 may send data request 72 to smartphone, requesting phone accelerometer data and/or phone motion indicators. In some embodiments, as illustrated in FIG. 13-B, smartphone 14 may use its own signal processing module to analyze phone accelerometer data (steps 290-292), thus saving processor time and therefore battery on smartwatch 12. In a step 296, smartphone 14 may transmit motion and location indicators to smartwatch 12. In response, state manager 50 of smartwatch 12 may determine the user activity context (step 298) by correlating phone and watch motion indicators with the location indicator and the current time. In a step 300, context indicator 70 is communicated to smartphone 14, allowing smartphone 14 to perform context-specific actions, as detailed above.

FIG. 15-A shows an exemplary sequence of steps performed by smartwatch 12 and/or smartphone 14 to retrieve context-specific data (such as data to be displayed by smartwatch 12 in the current operation mode) from back-end server 16, according to some embodiments of the present invention. FIG. 15-B shows an exemplary sequence of steps performed by smartwatch 12 and/or smartphone 14 to send context-specific data to server 16, according to some embodiments of the present invention. Such situations may arise, for instance, when the current user activity context is conducive to smartwatch 12 collecting data about the user. In one such example, smartwatch 12 may automatically start to count steps in response to determining that the user is currently running. The information collected during the respective running session (e.g., distance travelled, number of steps, calories spent, etc.) may be sent to server 16 via smartphone 14, using the illustrated sequence of steps.

FIGS. 16-A-B illustrate time series of acceleration measurements collected on smartphone 14 and smartwatch 12. The signals of FIG. 16-A were collected during a first time interval (time window), wherein the user is walking while looking at the watch. In contrast, the signals of FIG. 16-B were collected during a second time interval (time window), wherein the user is walking normally, i.e., arms swinging. In both cases, the phone was in the user's pocket. The illustrated signal differences may allow context-detection algorithms to distinguish between one user activity context and another, by correlating motion indicators determined for smartphone 14 with motion indicators determined for smartwatch 12.

Figure 17:
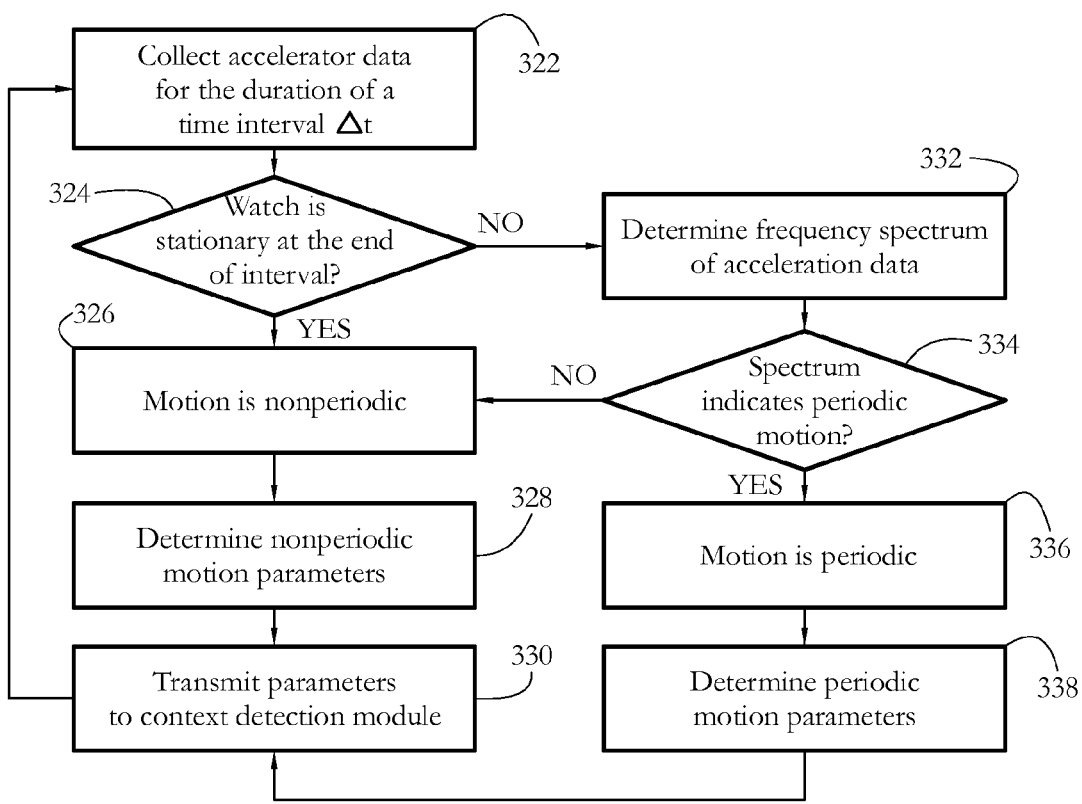
FIG. 17 shows an exemplary sequence of steps performed by a signal processing module executing on the smartwatch or on the smartphone according to some embodiments of the present invention.

FIG. 17 shows an exemplary sequence of steps performed by watch signal processing module 56 to analyze watch accelerometer data, to determine watch motion indicators. Similar calculations may be carried out by phone signal processing module 57 to determine phone and/or watch motion indicators. In some embodiments, motion indicators include, among others, an indicator of whether the motion is periodic or not, an amplitude of a accelerometer signal, a range of an accelerometer signal, a dominant frequency of the signal, and a set of periodic and/or non-periodic motion parameters further illustrated below. Such indicators may be further used by context detection module 61 and/or state manager 50 to determine the user activity context.

A step 322 may collect accelerator data for the duration of a unit time interval (e.g., 1 second). Such accelerator data may include a time series of acceleration (or another indicator of acceleration, such as a force or an electrical signal), as illustrated by the examples in FIGS. 16-A-B. In some embodiments, the collected data comprises several distinct time series, each time series representing acceleration along a distinct direction or plane. In one such example, one series may represent a component of the acceleration along the plane of the display of the respective device (phone or watch), while another series may represent a component of the acceleration perpendicular to the plane of the display. In some embodiments, several time series may be combined into one, indicative, for instance, of an absolute value of the acceleration (e.g., equation [1]). Collected data may be further processed in step 322, for instance by low-pass filtering and/or to remove measurement bias and artifacts.

A step 324 determines whether the smartwatch 12 is stationary at the end of the current data collection time interval. In some embodiments, smartwatch 12 is considered stationary when the accelerometer signal stays below a pre-determined threshold for a pre-determined duration (e.g., 0.3 seconds). When yes, in a step 326, signal processing module 56 may determine that the motion is not periodic. Exemplary user activity contexts consistent with nonperiodic motion of smartwatch 12 include the user gesticulating, riding a bicycle with the watch-wearing hand on the handlebars, talking on the phone, and typing at a computer keyboard. A further step 328 determines nonperiodic motion parameters. In some embodiments, such parameters include an indicator of a position of smartwatch 12 at the start and/or at the end of the current measurement interval, and an indicator of a spatial orientation of smartwatch 12, for instance with respect to a vertical direction. Such indicators may be computed, for instance, by numerically integrating the acquired accelerometer signals, and/or by determining an angle between a current measurement of the acceleration and the gravitational acceleration. A step 330 may transmit motion indicators determined in steps 326-328 to context-detection module 61 or to another module, such as state manager 50.

When the watch is not stationary, a step 332 may determine a frequency spectrum of the acquired acceleration data. In some embodiments, determining the frequency spectrum comprises representing the acceleration time series as a superposition of a plurality of frequency components, each component having a distinct frequency and an amplitude determined for the respective frequency. Exemplary frequency spectra may be obtained, among others, by applying a Fourier transformation of a cosine transformation to the acceleration time series. A step 334 may determine whether the frequency spectrum indicates a periodic motion. When no, the motion is deemed nonperiodic (step 326 above).

Exemplary user activity contexts consistent with a periodic motion of smartwatch 12 include walking and running, among others. When the frequency spectrum indicates periodic motion, a step 338 may determine a set of periodic motion parameters. Such parameters may include, among others, a set of dominant frequencies (i.e., frequencies of signal components having amplitudes exceeding a predetermined threshold), a set of amplitudes determined at selected frequencies, and an entropy of the acquired acceleration signal. Such parameters are then forwarded to context-detection components (step 330).

Context detection may include correlating motion indicators determined for smartwatch 12 with motion indicators determined for smartphone 14, and further with time and location indicators. Some exemplary values of motion indicators indicative of particular user activity contexts are listed below. Also listed are some examples of context-specific actions triggered in response to detecting each exemplary user activity context.

a) Looking at the watch. Time: any. Location: any. Phone motion: any. Watch motion: indicative of a particular movement of the wrist (translation and rotation) consistent with the user looking at the watch. In some embodiments, motion indicators that trigger this user activity context indicate that the watch moved from a stationary state to another stationary state, during a time interval of approximately 2 seconds. Moreover, in the end state, the watch display may be facing upward. The end state may be maintained for a pre-determined time interval (e.g., 1 second).

b) Sleeping. Time: evening to morning. Location: at home. Phone motion: stationary. Watch motion: stationary or rare erratic movements. In some embodiments, in response to detecting the sleep context, smartwatch 12 may switch to a display template that uses letters, figures, and/or other graphic symbols that are particularly easy to read in the dark (e.g., big lettering, bold face, etc.). In some embodiments, in response to detecting the sleep context, smartwatch 12 may record the quality of the sleep and/or perform silent alarms (e.g., vibrate). Also, in the sleep context, the screen may updated less often than during waking hours, to conserve power.

c) Preparing for work. Time: workday, morning (e.g., 6 to 9 AM). Location: at home (or at the location previously detected in relation to the sleep context). Phone motion: stationary. Watch motion: consistent with a few steps, gesturing and erratic movements. Such values of motion indicators are consistent with a situation in which smartphone 14 is on a table, nightstand, or charging cradle, smartwatch 12 is on the wrist of the user, and the user is doing various morning activities (e.g., washing, showering, dressing, eating breakfast, etc.). In response to detecting a "preparing for work" user activity context, smartwatch 12 may display specific information, such as a list of calendar events scheduled for the respective day (e.g., meetings), the weather forecast, dressing suggestions determined according to the schedule of the day and/or the weather forecast, selected news stories, stock market data, etc. Such displayed items may be customized by the user, e.g., via a web interface, and communicated to smartwatch 12 as part of display template 62 (FIG. 5).

d) Walking. Time: any. Location: any. Phone motion: stationary or indicative of steps. Watch motion: indicative of steps. Context-specific action: smartwatch may display a count of steps, a distance walked, etc. In some embodiments, context detection may differentiate, according to values of motion indicators, between walking with the phone in hand, walking with the phone in a pocket of the pants, and walking with the phone in a bag or purse. An exemplary motion indicator consistent with walking includes a dominant frequency of the acceleration signal between 1 and 3 Hz. Differentiating between walking with the phone in hand and walking with the phone in the pocket/purse may comprise computing a measure of synchronicity between the motion of the watch and the motion of the phone (high synchronicity may indicate walking with the phone in hand). Differentiating between the phone in the pocket and the phone in a bag/purse may be achieved, for instance, according to the amplitude and/or frequency spectrum of the acceleration signal measured on the phone.

e) Running. Time: anytime, or inferred from the usual pattern of activity. Location: any location, a park, a fitness facility. Watch motion: indicative of running (e.g., indicative of steps, but with larger amplitude and/or frequency than in walking) Phone motion: phone possibly out of range, or indicative of running (e.g., steps, vigorous, same frequency as watch). Context-specific action: display count of steps, cadence, distance run, calories spent, progress towards a pre-determined fitness goal, etc.

f) At the office. Time: workday, office hours. Location: at work, or consistent with a current calendar event. Phone motion: stationary or small, erratic movements. Watch motion: erratic, small movements, consistent with typing, etc. Context-specific actions: display scheduled meetings, contacts. In some embodiments, in response to detecting that the user is typing, smartwatch 12 may automatically attempt to connect to a device (e.g. computer system) that the user is currently typing into. Such connections may allow smartwatch 12 to use a display of the respective computer system to display to the user a rich representation of data, representation that would otherwise not be possible on a small screen, or to use the respective computer system as a relay for exchanging data with back-end server 16. Other exemplary context-specific actions include determining whether the user in currently in a meeting, and automatically setting the phone ringer to mute. Some embodiments may collect data indicative of watch motion for the duration of the respective meeting, and determine an indicator of participation of the respective user (e.g., whether the user was restless, gesticulating, or mostly passive). Such indicators may help the user to better remember particular meetings, and to decide, for instance, whether to attend future similar meetings.

g) Travelling. Time: any time, or local morning time. Location: a substantial distance away from both home and office, maybe a different time zone. Phone and watch motion: any, or consistent with a "preparing for work" context. Context-specific action: display time in the current time zone, time at home, current location, suggest a local café/restaurant, suggest local tourist attractions, warn user about particular local cultural practices (e.g., gestures, phrases or gifts to avoid, etc.).

h) Driving/public transportation. Time: anytime. Location: outside, moving with an average speed consistent with transportation. Phone and watch motion: highly synchronized, non-periodic, accelerating/braking over periods of a few seconds. Exemplary context-specific actions: display next bus station, distance to destination, connection information, estimated arrival time, map, suggeyulest alternative route, etc.

i) Cycling. Time: any time, or outside office hours. Location: stationary (gym), or outside, changing with a speed in the range of a bicycle. Watch motion: consistent with hands on handlebars (e.g., non-periodic, erratic, vibration). Phone motion: consistent with pedaling (e.g., periodic). Exemplary context-specific action: similar to running, display map, current speed, etc.

j) Smartphone in hand. Time: any time. Location: any location. Watch and phone motions: highly synchronized, describing a similar trajectory in 3D. Context-specific actions for this user activity context may rely on the fact that the two devices are in close proximity to each other. For instance, in response to detecting the "smartphone in hand" context, some embodiments may initiate a data transfer between smartwatch 12 and smartphone 14 (such transfers may be substantially faster and consume substantially less power when devices are close together). In another example, in response to detecting the "smartphone in hand" context, some embodiments may automatically unlock smartphone 14. In some embodiments, the "smartphone in hand" context may trigger a particular operating mode of smartwatch 12 and/or smartphone 14, wherein either of the devices may be used as a remote control device (e.g., gaming controller), and/or as an identity attestation device (the combination of phone and watch may serve as an identification token for the user).

FIGS. 18-A-B-C show an exemplary sequence of steps performed by context-detecting components executing on smartwatch 12 and/or smartphone 14, according to some embodiments of the present invention. Such steps illustrate an exemplary context detection algorithm that uses a decision diagram. Alternative embodiments may use automated pattern recognition or classification methods, for instance neural network or fuzzy logic algorithms, to identify user activity context according to a time indicator, a location indicator, and further according to phone and watch motion indicators.

Some embodiments determine user context hierarchically. In one such example, a primary context is determined according to the current time (step 344). A secondary context may be determined according to a current location (step 346), received from geolocation device 34 of smartphone 14. The secondary context (e.g., at home, at the office) may be selected from a set of possible contexts associated with a primary context. In some embodiments, a third-level context may be determined according to the current motion of smartwatch 12 and/or smartphone 14. FIG. 18-A shows exemplary context detection when motion indicators indicate that both smartwatch 12 and smartphone 14 are moving. A step 350 may determine an indicator of synchronicity between the motion of smartwatch 12 and the motion of smartphone 14. An exemplary synchronicity indicator comprises an autocorrelation function. When the two motions are highly synchronized, a step 360 may determine a current travel speed of smartphone 14 (e.g., according to data received from geolocation device 34). When the speed is consistent with the motion of a car, bus, etc., some embodiments determine that the current activity context is "driving or public transportation". When the current speed is consistent with human propulsion, some embodiments may determine that the current activity context is "smartphone in hand", i.e., that the smartwatch is attached to the wrist of the hand that is currently holding the smartphone.

A step 352 may determine whether both motions are periodic. When yes, a step 354 determines whether the motion indicators indicate a vigorous motion (e.g., according to the amplitude and/or dominant frequency of the acceleration). When yes, some embodiments may determine that the current user activity context is "running with the phone". When no, the current activity context may be "walking with the phone". Additional analysis of motion indicators may further distinguish, for instance, between having smartphone 14 in a pocket of the pants, or in a bag (for instance, the two cases may have distinct features of the frequency spectrum).

FIG. 18-B shows an exemplary context detection, when only one of smartwatch 12 and smartphone 14 is moving. When the watch motion is periodic, some embodiments may determine that the current activity context is "walking without the phone". Such a context may describe a situation in which the user has left the phone behind (e.g., on the desk, in a coat pocket). An exemplary context-specific action for this context may be to display on smartwatch 12 a current location of smartphone 14, or the most recent time when smartphone 14 was moving. Such displays may allow the user to easily locate a (possibly forgotten or misplaced) phone.

When the watch motion indicators indicate a non-periodic motion, i.e., not consistent with walking, running, etc., some embodiments may determine whether the current location is at the office, and when yes, whether the user is currently in a meeting (e.g., according to a calendar entry). When the current location is not the office, and not at home, some embodiments may determine that the user is currently undergoing some physical activity (e.g. fitness, sports). Such assessments may be further made according to an intensity of motion, as determined, for instance, from an amplitude of the accelerometer signal of smartwatch 12.

When the current location is at home, and when the time is consistent with the morning interval (e.g., 6-9 AM), some embodiments may determine that the user is currently preparing for work (e.g., showering, dressing, eating breakfast, etc.). At other times of the day, some embodiments may determine that the user is relaxing at home (e.g., cooking, watching TV, etc.).

FIG. 18-C illustrates an exemplary context detection when both smartwatch 12 and smartphone 14 are moving, but the two motions are not both periodic. In some embodiments, non-periodic motion comprises generally non-repetitive motion, such as motion indicative to taking less than 4 consecutive steps, hand gestures, vibration, bursts of activity interspersed with stationary periods, etc. Activity contexts illustrated in FIG. 18-C assume that the user is currently carrying both smartphone 14 and smartwatch 12. When the watch motion is periodic, some embodiments may determine a "Gaming" context, indicative, for instance, of the user operating a game console. When the watch motion is non-periodic, but the phone motion is, some embodiments may determine that the user is cycling or using an exercise bicycle (such indicators are consistent with a user pedaling with the hands on the handlebars and the phone in the pocket. When neither the phone motion, nor the watch motion is periodic, some embodiments may determine that the user is currently doing household work or is at a social event (e.g., party). Such contexts may be further refined according to a location and/or time indicator.

The exemplary systems and methods described above allow the determination of a user activity context, by correlating a motion of a wearable computing device (watch) with a motion of a smartphone. Some embodiments of the present invention rely on the insight that such devices are typically used in a particular manner, that distinguishes them from other electronic devices, such as fitness sensors, tablet computers, game consoles, etc. For instance, a watch is typically worn attached to a user's wrist, and may therefore experience a motion consistent with the motions of the lower arm, such as swinging, waving, gesturing, typing etc. Since humans frequently use the arms and hands in everyday activities related to work and social interaction, motion of the watch may be indicative of such activities. Mobile phones are typically carried either in the hand, in a pocket, or in a bag/purse. When placed in a pocket, motion of the mobile phone may be indicative of the motion of the user's upper leg, and therefore, indicative of the user's current activity (e.g., sitting, walking, cycling). Placing the phone in a bag, as opposed to a pocket, may be further revealing of a user's current activity and/or social situation. Mobile phones may also be placed flat on the surface of an object (desk, nightstand, etc.), in the vicinity of the user. Immobility of the phone may provide further clues to the user's current activity context. By correlating the motion of the watch with the motion of the mobile phone, some embodiments thus distinguish among a rich variety of user activity contexts and situations.

Correlating the motion of the watch with the motion of the mobile phone enables some embodiments of the present invention to determine relatively sophisticated user activity contexts. Some such contexts may encompass entire classes of human activities. An exemplary user activity context according to some embodiments of the present invention may represent all kinds of body movements executed by a person when dressing up in the morning. Another context may generically represent all kinds of gestures and pacing done by a person giving an oral presentation at a work meeting. In contrast, conventional gesture-recognition systems typically detect individual gestures, such as the user raising the forearm to look at the watch, or the user shaking the wrist.

In some embodiments, motion indicators are further correlated with an indicator of a current location of the mobile telephone, and with a current time of the day. Such correlations may serve to more accurately distinguish among a plurality of activity contexts. For instance, the same gesture or activity performed at home and at work may have a distinct meaning and importance to the user. Similarly, the same motion indicators may indicate distinct user activity contexts on a weekend, as opposed to during a workday.

In some embodiments, context detection serves as a trigger for context-specific action by the smartwatch and/or mobile telephone. Such context-specific action may include displaying context-specific data to the user. For instance, the watch may display a weather forecast in response to detecting that the user is dressing for the day, and driving directions in response to detecting that the user is currently driving. Such targeted, customized content tailored to the user's current activity and needs may significantly enhance the experience offered by a wearable computing device.

Power consumption is a critical limitation in many wearable computing devices, including smart watches. Some embodiments of the present invention keep the power consumed by the watch to a minimum, by performing some of the computation required for context detection on the processor of the mobile phone, and by maintaining a communication link allowing the mobile phone to exchange data, including results of context detection, with the watch. In some embodiments, the watch remains in a sleep mode corresponding to a minimal power consumption, and wakes up in response to receiving data from the mobile phone. In response to determining the current user activity context, the watch may perform a context-specific action (e.g., display some information to the user, or collect some data), and then return to the sleep mode. Power consumption is often an important manufacturing criterion, when deciding whether to include a geolocation device (e.g., GPS receiver) in a smartwatch. Such devices may provide useful information to the user, but may be substantial energy consumers. Some embodiments of the present invention do not require that the watch include a geolocation device (therefore extending battery life), while still using the benefits of a location indicator provided by the mobile telephone.

It will be clear to a skilled artisan that the above embodiments may be altered in many ways without departing from the scope of the invention. Accordingly, the scope of the invention should be determined by the following claims and their legal equivalents.

What is claimed is:

1. A wearable computing device comprising a processor and a first accelerometer connected to the processor, the wearable computing device configured to attach to a wrist of a user's hand, wherein:
   the first accelerometer is configured to determine a first motion indicator indicative of a motion of the wearable computing device; and the processor is configured to execute a context-specific action selected according to a user activity context determined according to the first motion indicator and according to a second motion indicator indicative of a motion of a mobile telephone communicatively coupled to the wearable computing device, the second motion indicator determined by a second accelerometer of the mobile telephone, wherein the user activity context is determined according to a degree of periodicity of the motion of the wearable computing device, and further according to a degree of periodicity of the motion of the mobile telephone, and wherein determining the user context comprises:

when both the motion of the wearable computing device and the motion of the mobile telephone are periodic, determining that the user is currently performing a first activity, when neither the motion of the wearable computing device, nor the motion of the mobile telephone is periodic, determining that the user is currently performing a second activity, and when only one of the motion of the wearable computing device and the motion of the mobile telephone is periodic, determining that the user is currently performing a third activity.

2. The wearable computing device of claim 1, wherein determining the user activity context further comprises determining whether the user is holding the mobile telephone in the user's hand.

3. The wearable computing device of claim 1, wherein determining the user activity context comprises determining whether the user is preparing to go to work.

4. The wearable computing device of claim 1, wherein determining the user activity context comprises determining whether the user is riding in a vehicle.

5. The wearable computing device of claim 1, wherein determining the user activity context comprises determining whether the user is attending a work meeting.

6. The wearable computing device of claim 1, wherein the context-specific action comprises requesting context-specific data from a remote computer system, and displaying a representation of the context-specific data on a display of the wearable computing device.

7. The wearable computing device of claim 1, wherein the context-specific action comprises employing a sensing device of the wearable computing device to acquire a set of data.

8. The wearable computing device of claim 1, wherein the context-specific action comprises sending a communication to the mobile telephone, wherein receiving the communication causes the mobile telephone to perform an action of the mobile telephone.

9. The wearable computing device of claim 1, wherein determining the user activity context comprises:

transmitting the first motion indicator from the wearable computing device to the mobile telephone, and in response, receiving at the wearable computing device a context indicator indicative of the user activity context from the mobile telephone, the context indicator determined by the mobile telephone according to the first and second motion indicators, and further according to a location indicator indicative of a current physical location of the mobile telephone.

10. The wearable computing device of claim 1, wherein determining the user context comprises:

employing the processor to receive the second motion indicator from the mobile telephone, employing the processor to receive a location indicator from the mobile telephone, the location indicator indicative of a current physical location of the mobile telephone, and in response to receiving the second motion indicator and the location indicator, employing the processor to identify the user activity context from a plurality of contexts according to the first and second motion indicators, and according to the location indicator.

11. The wearable computing device of claim 1, wherein the user activity context is determined further according to the current time.

12. The wearable computing device of claim 1, wherein the user activity context is determined further according to a calendar event scheduled for the user.

13. The wearable computing device of claim 1, wherein the user activity context is determined further according to a degree of synchronization between the motion of the wearable computing device and the motion of the mobile telephone.

14. The wearable computing device of claim 1, wherein the first motion indicator is determined according to a first plurality of acceleration values recorded by the first accelerometer during a first time interval, and wherein the second motion indicator is determined according to a second plurality of acceleration data recorded by the second accelerometer during a second time interval.

15. The wearable computing device of claim 1, wherein the user activity context is further determined according to whether the wearable computing device is currently stationary and according to whether the mobile telephone is currently stationary.

16. The wearable computing device of claim 1, wherein determining the user activity context further comprises determining whether the user is carrying the mobile telephone in a user's pocket.

17. A method comprising:

employing an accelerometer of a wearable computing device to determine a first motion indicator indicative of a motion of the wearable computing device, wherein the wearable computing device is configured to attach to a wrist of a user's hand; and employing a processor of a mobile telephone communicatively coupled to the wearable computing device to determine a user activity context according to the first motion indicator and according to a second motion indicator indicative of a motion of the mobile telephone, wherein the second motion indicator is determined by an accelerometer of the mobile telephone, wherein the user activity context is determined according to a degree of periodicity of the motion of the wearable computing device, and further according to a degree of periodicity of the motion of the mobile telephone, and wherein determining the user context comprises:

when both the motion of the wearable computing device and the motion of the mobile telephone are periodic, determining that the user is currently performing a first activity, when neither the motion of the wearable computing device, nor the motion of the mobile telephone is periodic, determining that the user is currently performing a second activity, and when only one of the motion of the wearable computing device and the motion of the mobile telephone is periodic, determining that the user is currently performing a third activity.

18. The method of claim 17, wherein determining the user activity context further comprises determining whether the user is holding the mobile telephone in the user's hand.

19. The method of claim 17, wherein determining the user activity context comprises determining whether the user is preparing to go to work.

20. The method of claim 17, wherein determining the user activity context comprises determining whether the user is riding in a vehicle.

21. The method of claim 17, wherein determining the user activity context comprises determining whether the user is attending a work meeting.

22. The method of claim 17, further comprising employing the processor of the mobile telephone to execute a second context-specific action selected according to the user activity context.

23. The method of claim 17, wherein the first context-specific action comprises requesting context-specific data from a remote computer system, and displaying a representation of the context-specific data on a display of the wearable computing device.

24. The method of claim 17, wherein the first context-specific action comprises employing a sensing device of the wearable computing device to acquire a set of data.

25. The method of claim 17, wherein the user activity context is determined further according to a current time.

26. The method of claim 17, wherein the user activity context is determined further according to a calendar event scheduled for the user.

27. The method of claim 17, wherein the user activity context is further determined according to a degree of synchronization between the motion of the wearable computing device and the motion of the mobile telephone.

28. The method of claim 17, wherein the first motion indicator is determined according to a first plurality of acceleration values recorded by the accelerometer of the wearable computing device during a first time interval, and wherein the second motion indicator is determined according to a second plurality of acceleration data recorded by the accelerometer of the mobile telephone during a second time interval.

29. The method of claim 17, wherein the user activity context is further determined according to whether the wearable computing device is currently stationary and according to whether the mobile telephone is currently stationary.

30. The method of claim 17, wherein determining the user activity context further comprises determining whether the user is carrying the mobile telephone in a user's pocket.

31. A non-transitory computer-readable medium storing instructions which, when executed by a processor of a wearable computing device configured to attach to a wrist of a user's hand, causes the wearable computing device to:
employ an accelerometer of the wearable computing device to determine a first motion indicator indicative of a motion of the wearable computing device; and
execute a context-specific action selected according to a user activity context determined according to the first motion indicator and according to a second motion indicator indicative of a motion of a mobile telephone communicatively coupled to the wearable computing device, the second motion indicator determined by a second accelerometer of the mobile telephone, wherein the user activity context is determined according to a degree of periodicity of the motion of the wearable computing device, and further according to a degree of periodicity of the motion of the mobile telephone, and wherein determining the user context comprises:
when both the motion of the wearable computing device and the motion of the mobile telephone are periodic, determining that the user is currently performing a first activity,
when neither the motion of the wearable computing device, nor the motion of the mobile telephone is periodic, determining that the user is currently performing a second activity, and
when only one of the motion of the wearable computing device and the motion of the mobile telephone is periodic, determining that the user is currently performing a third activity.

32. A non-transitory computer-readable medium storing instructions which, when executed by a processor of mobile telephone communicatively coupled to a wearable computing device configured to attach to a wrist of a user's hand, causes the mobile telephone to:
employ an accelerometer of the mobile telephone to determine a first motion indicator indicative of a motion of the mobile telephone;
determine a user activity context according to the first motion indicator and according to a second motion indicator indicative of a motion of the wearable computing device, the second motion indicator determined by an accelerometer of the wearable computing device, wherein the user activity context is determined according to a degree of periodicity of the motion of the wearable computing device, and further according to a degree of periodicity of the motion of the mobile telephone, and wherein determining the user context comprises:
when both the motion of the wearable computing device and the motion of the mobile telephone are periodic, determining that the user is currently performing a first activity,
when neither the motion of the wearable computing device, nor the motion of the mobile telephone is periodic, determining that the user is currently performing a second activity, and
when only one of the motion of the wearable computing device and the motion of the mobile telephone is periodic, determining that the user is currently performing a third activity.

* * * * *